United States Patent [19]

Mihara

[11] Patent Number: 5,119,237
[45] Date of Patent: Jun. 2, 1992

[54] ZOOM LENS SYSTEM

[75] Inventor: Shinichi Mihara, Tokyo, Japan

[73] Assignee: Olympus Optical Co., Ltd., Tokyo, Japan

[21] Appl. No.: 648,903

[22] Filed: Jan. 31, 1991

[30] Foreign Application Priority Data

Feb. 2, 1990 [JP] Japan .................. 2-22223

[51] Int. Cl.⁵ .......................................... G02B 15/00
[52] U.S. Cl. .................................. 359/676; 359/683
[58] Field of Search ........................... 350/423, 427

[56] References Cited

U.S. PATENT DOCUMENTS

| 4,256,381 | 3/1981 | Kreitzer | 350/423 |
| 4,571,033 | 2/1986 | Kato et al. | 350/427 |
| 4,763,998 | 8/1988 | Tsuji et al. | 350/427 |

FOREIGN PATENT DOCUMENTS

| 47-42175 | 10/1972 | Japan . |
| 57-12125 | 3/1982 | Japan . |
| 58-32364 | 7/1983 | Japan . |
| 60-184221 | 9/1985 | Japan . |
| 61-296317 | 12/1986 | Japan . |
| 62-54213 | 3/1987 | Japan . |
| 63-123009 | 5/1988 | Japan . |
| 63-287810 | 11/1988 | Japan . |

Primary Examiner—Frank Gonzalez

[57] ABSTRACT

A zoom lens system comprising, in the order from the object side, a first lens unit having a positive refractive power, a second lens unit having a negative refractive power, an aperture stop, a third lens unit having a positive refractive power and a fourth lens unit having a weak refractive power, adapted so as to perform variation of focal length by displacing the second lens unit and the third lens unit in the directions reverse to each other along the optical axis with the first lens unit and the fourth lens unit kept fixed, and having a favorable optical performance and a total length shortened by using a small front lens component.

14 Claims, 22 Drawing Sheets

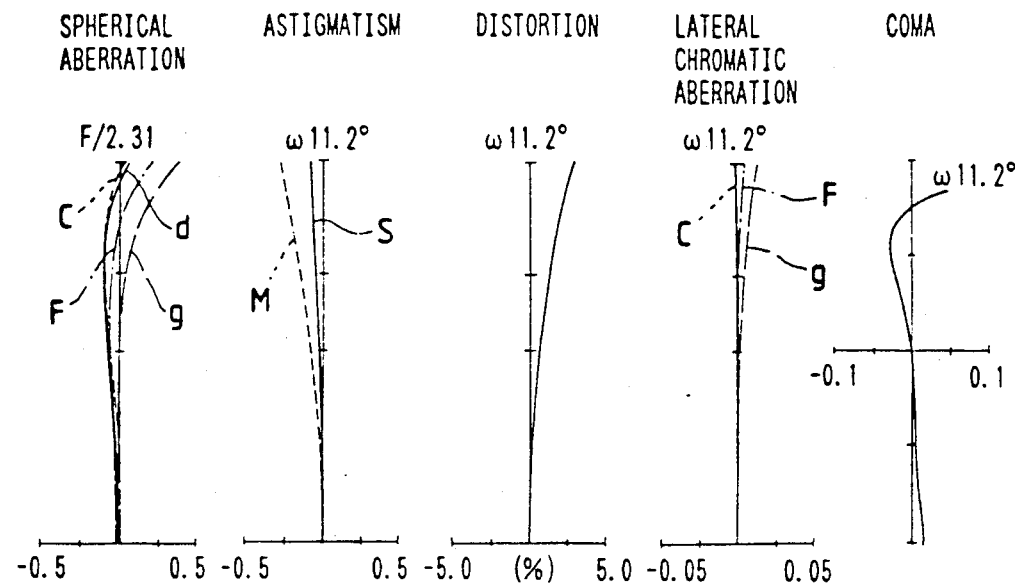
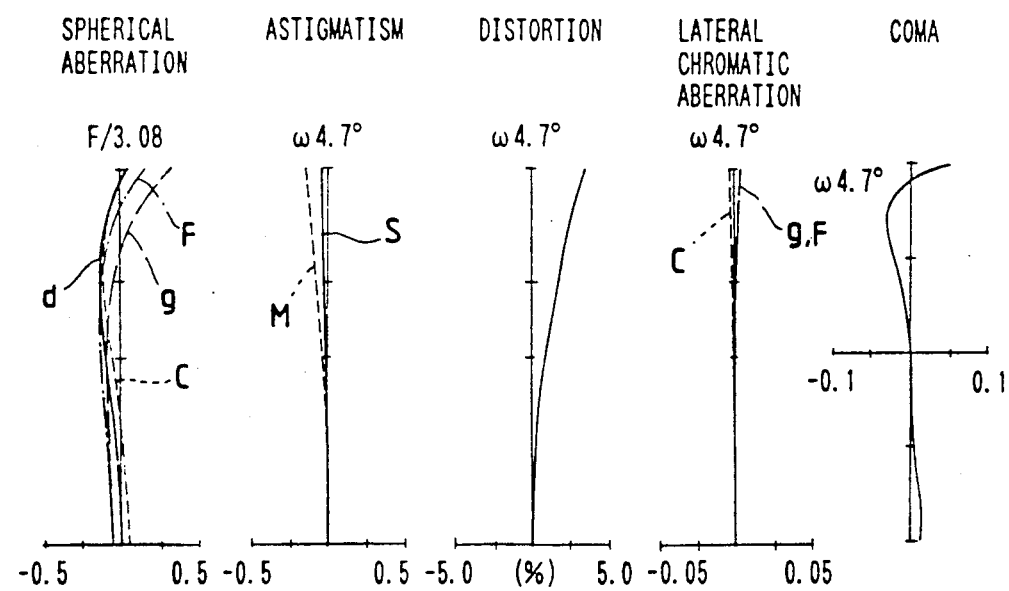

ZOOM LENS SYSTEM

BACKGROUND OF THE INVENTION a) Field of the Invention

The present invention relates to a zoom lens system, and more specifically to a compact zoom lens system for use with cameras, etc. employing electronic image pickup devices.

b) Description of the Prior Art

Under the recent trend to develop compacter video cameras for domestic use, various attempts are made to design compacter imaging lens systems. In order to design compacter imaging lens systems, efforts are made to shorten total lengths of the lens systems and reduce diameters of front lens components.

In the attempts to design compacter zoom lens systems, field angles of the lens systems are narrowed and aperture ratios thereof are lowered to F/2.0 from F/1.4 which was the conventional main specification item.

The conventional zoom lens system for video cameras consists, in the order from the object side, of a first lens unit having a positive refractive power, a second lens unit having a negative refractive power and movable along the optical axis for variation of focal length, a third lens unit having a negative or positive refractive power and movable along the optical axis for compensating the deviation of the image point caused by the variation of focal length, and a fourth lens unit which is designed as a relay lens unit having an imaging function and always kept stationary, and comprises an aperture stop fixed between the third lens unit and the fourth lens unit or in the fourth lens unit. The conventional zoom lens system having the composition described above requires wide airspaces to be reserved between the front lens component and the aperture stop, and has an entrance pupil located deep in the lens system, whereby the front lens component inevitably has a large diameter. As a zoom lens system which has the above-described composition but is designed so as to use a front lens component having a small diameter, there is known the lens system disclosed by Japanese Patent Kokai Publication No. Sho 62-54213. This zoom lens system uses a first lens unit and a second lens unit which are thinner so as to locate the entrance pupil shallow in the lens system, thereby being compatible with a front lens component having a smaller diameter. Further, the zoom lens system disclosed by Japanese Patent Kokai Publication No. Sho 63-287810 uses first through third lens units which are composed of lens elements in a number as small as possible and selects a refractive power distribution which permits effectively utilizing the airspaces varied for variation of focal length so that the entrance pupil thereof is located shallow in the lens system and a small front lens component is compatible with the lens system.

Furthermore, the displacement of the first lens unit along the optical axis for focusing can be mentioned as another factor for increasing the diameter of the front lens component. That is to say, when the first lens unit is displaced toward the object side for focusing, the entrance pupil of the lens system is located deep in the lens system, thereby making it necessary to enlarge the diameter of the front lens component. As a conventional example which corrects the defect of the enlargement of the front lens component for the reason described above, there is known, for example, the zoom lens system disclosed by Japanese Patent Kokai Publication No. 60-184221. This zoom lens system is designed so as to perform focusing by moving the lens unit arranged after the aperture stop, thereby preventing the front lens component from having a large diameter. However, even this conventional zoom lens system is insufficient in the reduction of the diameter of the front lens component.

Moreover, there are known zoom lens systems which omit the third lens unit having the function to compensate for the deviation of the image point caused by the variation of focal length (the function as a variator) by sharing the function of the variator among all or some of the lens units which are arranged after the aperture stop and have the function of the relay lens system, thereby narrowing the airspaces between the aperture stop and the front lens component arranged on the object side thereof, and allowing to use a front lens component having smaller diameters. These zoom lens systems are those disclosed by Japanese Patents Kokoku Publication No. Sho 47-42175, Kokoku Publication No. Sho 57-12125, Kokai Publication No. Sho 63-123009 and so on. Especially by sharing the function of the compensator among all of the lens units arranged after the aperture stop (the rear subsystem) and selecting such a refractive power distribution as to displace the rear subsystem for zooming in the direction opposite to the moving direction of the second lens unit $G_2$ having the negative refractive power, it is possible to impart a vari-focal function also to this rear subsystem and shorten the displacement distance for zooming of the second lens unit having the vari-focal function. When the displacement distance of the second lens unit $G_2$ is shortened as described above, the airspaces can be reduced between the aperture stop and the front lens component, thereby making it possible to reduce the diameter of the front lens component. However, the zoom lens system which is designed so as to displace the rear subsystem arranged after the aperture stop for zooming is undesirable since it allows aberrations, especially coma and spherical aberration, to remain in uniform tendencies over the entire vari-focal range. For this reason, there are proposed zoom lens systems, as exemplified by that disclosed by Japanese Patent Kokoku Publication No. Sho 57-12125, which are adapted so as to correct aberrations favorably over the entire vari-focal range by arranging, after the third lens unit, an additional lens unit which has a fixed location, a weak refractive power and a purpose of correcting aberrations.

However, the zoom lens system disclosed by Japanese Patent Kokoku Publication No. Sho 57-121215 does not contribute so much for reduction of the diameter of the front lens component since it comprises an aperture stop which is arranged between the third lens unit and the fourth lens unit.

In addition, it is possible to reduce the diameter of the front lens component of the zoom lens system disclosed by Japanese Patent Kokoku Publication No. Sho 58-32364 when the aperture stop comprised therein is located at the position specified for the aperture stop arranged in the lens system disclosed by Japanese Patent Kokoku Publication No. Sho 47-42175. As an example of such a zoom lens system, there are known lens systems, for example, that disclosed by Japanese Patent Kokai Publication No. Sho 61-296317.

This conventional example consists, in the order from the object side, of a focusing lens unit, a negative variator lens unit, a positive variator lens unit and a fixed lens unit, is adapted so as to perform variation of focal length while maintaining the image point thereof at a constant location by displacing both the variator lens units in the directions reverse to each other, and comprises an aperture stop which is fixed at a middle position between the positions of the variators when there are located closest to each other. In contrast to the lens system disclosed by Japanese Patent Kokoku Publication No. Sho 62-54213 and the similar ones wherein aperture stops can be located only at positions on the image side of the airspaces reserved between the third lens units and the fourth lens units, said conventional example comprises the aperture stop between the variators (the second lens unit and the thrid lens unit), i.e., on the object side of the airspace reserved between the third lens unit and the fourth lens unit, and therefore can have an entrance pupil located closer to the lens unit, thereby permitting reducing the diameter of the front lens component. Though said conventional example permits reducing the diameter of the front lens component, it has a defect to enlarge the diameter of the rear lens component. This is because the entrance pupil is brought closer to the first surface of the lens system but the exit pupil is brought farther from the final surface of the lens system by shifting the aperture stop toward the object side. Moreover, it cannot be said that this conventional example permits sufficiently reducing the diameter of the front lens component and has a total length sufficiently short.

In the future where video cameras will be compacter and image pickup devices will be smaller, it will be necessary to design a compacter imaging lens system. For compacter designs of imaging lens system, it is insufficient to make the lens system smaller as a whole in proportion to reduction of an imaging surface since marginal portions of lens elements cannot be thinned extremely and airspaces between lens elements cannot be narrowed extremely from the viewpoint of practical manufacturing and assembly of the lens elements. For this reason, reduction of the diameter of the front lens component poses a problem very important for lens design.

SUMMARY OF THE INVENTION

A primary object of the present invention is to provide a zoom lens system which is composed of four or three lens units, comprises an aperture stop between a second lens unit and a third lens unit, adapted to perform variation of focal length by displacing a second lens unit and the third lens unit in the directions reverse to each other, adopts a composition or compositions of the lens unit or units arranged on the image side of the aperture stop contrived so as to prevent a rear lens component from having a large diameter, and has a small diameter on a front lens component, a short total length, a high aperture ratio and favorably corrected aberrations.

The zoom lens system according to the present invention comprises, in the order from the object side, a first lens unit having a positive refractive power, a second lens unit having a negative refractive power, an aperture stop, a third lens unit having a positive refractive power and a fourth lens unit having a weak refractive power, adapted so as to perform variation of focal length by displacing the second lens unit and the thrid lens unit along the optical axis in the direction reverse to each other while keeping the first lens unit and the fourth lens unit stationary, each of said first lens unit and fourth lens unit being composed of three or less lens elements, and is designed so as to satisfy the following conditions (1), (2) and (3):

$$-0.5 \sqrt{f_W \cdot f_T} < HF_{III,IV} < 2 \sqrt{f_W \cdot f_T} \quad (1)$$

$$0.15 \sqrt{f_W \cdot f_T} < t_{IV} < 0.5 \sqrt{f_W \cdot f_T} \quad (2)$$

$$0.2 \sqrt{f_W \cdot f_T} < t_I < 0.5 \sqrt{f_W \cdot f_T} \quad (3)$$

wherein the reference symbol $HF_{III,IV}$ represents the distance as measured from the object side surface of the third lens unit to the front principal point of the total system composed of the third lens unit and the fourth lens unit at the tele position, the reference symbol $t_{IV}$ designates the distance as measured from the most object side surface of the fourth lens unit to the most image side surface thereof, the reference symbol $t_I$ denotes the distance as measured from the most object side surface of the first lens unit to the most image side surface thereof, and the reference symbols $f_W$ and $f_T$ represents the focal lengths of the zoom lens system as a whole at the wide position and the tele position respectively.

Out of the conditions mentioned above, the conditions (1) and (2) are adopted for shortening the total length of the zoom lens system as a whole by designing compact the rear subsystem (the third lens unit and the fourth lens unit) arranged on the image side of the aperture stop.

Diameters of the lens elements arranged in the rear subsystem are determined mostly by the offaxial light bundle, which is influenced by the location of the exit pupil. When the direction from the image point toward the object side is taken as negative, a positive location of the exit pupil will remarkably enlarge the diameters of the lens elements arranged in the rear subsystem. A negative location of the exit pupil which is large in absolute value thereof will enlarge the diameters of the lens elements arranged in the rear subsystem to a certain degree. Since the exit pupil is an image of the aperture stop formed by the rear subsystem or the lens units arranged on the image side of the aperture stop, it is necessary for reducing the diameter of the rear subsystem to form the image at a location on the object side of an image of object formed by the zoom lens system and at an adequate distance from the image of object. For this purpose, it is sufficient to locate the front principal point of the total system composed of the third lens unit and the fourth lens unit (the rear subsystem) at a position shifted as far as possible toward the object side. When the exit pupil is located at such a position, the total system composed of the third lens unit and the fourth lens unit has little flexibility for selection of the focal length thereof, and the rear principal point thereof is shifted toward the object side, thereby facilitating to shorten the total length thereof.

The condition (1) defines the location of the total system composed of the third lens unit and the fourth lens unit at the tele position. If the upper limit of the condition (1) is exceeded, the distance $HF_{III,IV}$ will have a large positive value, the rear lens component will have a large diameter and the rear subsystem will have a long total length, thereby enlarging the rear subsystem as a whole. If the lower limit of the condition (1) is exceeded, in contrast, it will be easy to reduce the diameter of the rear lens component, but the offaxial light bundle will have too large an angle of incidence on the image surface, thereby tending to lower photoelectric conversion efficiency on electronic image pickup devices, and produce positional deviation between color filter and images.

The condition (2) defines the distance as measured from the most object side surface of the fourth lens unit to the most image side surface thereof (the thickness of the fourth lens unit as a whole). The third lens unit is used as a vari-focal lens unit, has a strong power for shortening the total length of the zoom lens system as a whole and comprises a large number of lens elements for correcting aberrations favorably. Further, the third lens unit requires a space of a certain width for displacement. Accordingly, it is impossible to shorten the total length of the zoom lens system as a whole unless the fourth lens unit is made as thin as possible. Furthermore, when the fourth lens unit is thick, the aperture stop is located far from the image surface, thereby making it impossible to reduce the diameter of the rear lens component. For this reason, the fourth lens unit as a whole is made as thin as possible in the zoom lens system according to the present invention. If the fourth lens unit has thickness exceeding the upper limit of the condition (2), the zoom lens system will have long total length, the exit pupil will be far from the image surface and the rear lens component will be apt to have a large diameter. If the lower limit of the condition (2) is exceeded, in contrast, it will be impossible to arrange the lens elements properly in the fourth lens unit.

The condition (3) is required for reducing the diameter of the front lens component.

If the upper limit of the condition (3) is exceeded, the entrance pupil will be far and the front lens component will have a large diameter, whereby the zoom lens system as a whole will be large and heavy. If the lower limit of the condition (3) is exceeded, in contrast, the lens elements which compose the first lens unit will be too thin for reserving the required thickness at the marginal portions thereof, thereby making it difficult to obtain the required effective diameters of the lens elements. In order to obtain the required effective diameters, it will be necessary to weaken the refractive powers of the lens elements to such a degree that chromatic aberration cannot be corrected in the first lens unit.

In the zoom lens system according to the present invention, the diameter of the front lens component is reduced by designing the lens system as a type which allows to locate the aperture stop on the object side of the location of the aperture stop in the conventional zoom lens system composed of the four lens units. The location of the aperture stop can be further shifted toward the object side by thinning each of the lens units arranged on the object side of the aperture stop, but it is practically difficult to manufacture such thin lens units. However, it is very effective for reducing the diameter of the front lens component to thin the lens unit which is arranged at a location at which the principal ray has a large angle of inclination. Speaking concretely, an effect for reducing the diameter of the front lens component can be obtained by thinning the first lens unit.

When the first lens unit is designed so as to satisfy the following conditions (4) and (5), it is possible, so far as chromatic aberration is correctable, to reduce the thickness of the first lens unit as a whole by weakening the refractive powers or reducing the number of the lens elements composing the first lens unit:

$$\nu_{1p} - \nu_{1n} > 18 \tag{4}$$

$$0.1 < |\phi_{1n}| \sqrt{f_W \cdot f_T} < 0.5 \tag{5}$$

wherein the reference symbol $\nu_{1p}$ represents an average Abbe's numbers of the positive lens elements arranged in the first lens unit, the reference symbol $\nu_{1n}$ designates an average Abbe's number(s) of the negative lens element(s) arranged in the first lens unit and the reference symbol $\Phi_{1n}$ denotes the refractive power(s) of the negative lens element(s) arranged in the first lens unit.

The condition (4) defines the difference between the average Abbe's number of the positive lens elements arranged in the first lens unit and the average Abbe's number of the negative lens element(s) arranged in the first lens unit. If the lower limit of the condition (4) is exceeded, chromatic aberration will be corrected insufficiently or the refractive power of each of the lens elements must be strengthened, thereby making it impossible to reduce the diameter of the front lens component.

The condition (5) defines the refractive power of the negative lens element(s) arranged in the first lens unit. If the upper limit of the condition (5) is exceeded, the negative lens element(s) will have too strong refractive power(s), whereby the positive lens elements must have strengthened refractive powers and it will be impossible to reduce the diameter of the front lens component. If the lower limit of the condition (5) is exceeded, in contrast, chromatic aberration will be corrected insufficiently, and spherical aberration will be corrected insufficiently at the tele position.

When the first lens unit is composed, in the order from the object side, of a negative lens element, a positive lens element and a positive lens element, it is desirable to determine the ratio between the refractive powers of the two positive lens elements so as to satisfy the following condition (6):

$$0.3 < \Phi_{1p1}/\Phi_{1p2} < 1.0 \tag{6}$$

wherein the reference symbol $\Phi 1p1$ represents the refractive power of the positive lens element which is arranged on the object side out of said two positive lens elements, and the reference symbol $\Phi 1p2$ designates the refractive power of the positive lens element which is arranged on the image side out of said two positive lens elements.

If the upper limit of the condition (6) is exceeded, a disadvantage will be produced for bringing the location of the entrance pupil close to the first lens unit. If the lower limit of the condition (6) is exceeded, it will be difficult to thin the first lens unit, thereby producing a disadvantage for bringing the location of the entrance pupil close to the first lens unit.

The fourth lens unit has a refractive power which is weak as compared with that of the zoom lens system as a whole and has a function substantially solely for correction of aberrations. A zoom lens system which is composed of three positive, negative and positive lens units, and adapted so as to perform variation of focal length by displacing the second lens unit and the third lens unit in the directions reverse to each other is advantageous for reducing the diameter of the front lens component. When it is attempted to design this zoom lens system so as to have a high vari-focal ratio, a high aperture ratio and a large field angle, however, aberrations, especially coma and spherical aberration, are apt to remain in uniform tendencies over the entire vari-focal range. In the zoom lens system according to the present invention, the fourth lens unit which has the weak refractive power and having the function for correcting aberrations is added to the zoom lens system composed of the three lens unit. Since the zoom lens system according to the present invention is enlarged by adding the fourth lens unit which usually has a large diameter, it is necessary to make this lens unit so as to have a diameter as small as possible. In order to correct the aberrations remaining in the first through third lens units, it is sufficient to compose the fourth lens unit of a small number of, or on the order of two, lens elements including a positive lens element and a negative lens element. However, at least one negative lens element must be of the meniscus type, which is to be convex on the object side and arranged on the most object side in the fourth lens unit or convex on the image side and arranged on the most image side in the fourth lens unit. The above-mentioned spherical aberration and coma can be corrected by arranging, on the side of the concave surface of said meniscus lens element and at a location adjacent thereto, a lens element having a convex surface whose radius of curvature is larger than that on said concave surface.

Further, the longitudinal chromatic aberration and lateral chromatic aberration can be corrected favorably by designing the fourth lens unit so as to satisfy the following condition (7):

$$-25 < \nu_{4p} - \nu_{4n} < 25 \qquad (7)$$

wherein the reference symbol $\nu_{4n}$ represents the Abbe's number of the medium of said negative meniscus lens element and the reference symbol $\nu_{4p}$ designates the Abbe's number of the lens element arranged adjacent to said negative meniscus lens element.

If the upper limit of the condition (7) is exceeded, the longitudinal chromatic aberration and the lateral chromatic aberration will be overcorrected. If the lower limit of the condition (7) is exceeded, said aberrations will be undercorrected.

By selecting the composition described above, it is possible to obtain a compact, light-weight zoom lens system having a short total length and composed of a small number of lens elements at a low manufacturing cost by shortening the diameters of the front lens component and the rear lens component.

Though aberrations are corrected favorably over the entire vari-focal range in the zoom lens system of the type described above, variation of coma may be allowed by the vari-focal lens units which have the refractive powers quite opposite to each other with regard to the aperture stop. In order to prevent this variation of coma, it is necessary to properly contrive compositions of the second lens unit and the third lens unit.

It is desirable to compose the second lens unit, in the order from the object side, of a negative lens element, a negative lens element and a positive lens element, and design especially the positive lens element so as to have a converging surface on the image side. Further, it is desirable to design said converging surface so as to have a radius of curvature $R_{26}$ satisfying the following condition (8):

$$-R_{26} < \sqrt{f_W \cdot f_T} \qquad (8)$$

It is possible to reduce the variation of coma by designing the second lens unit so as to satisfy the condition (8). If $-R_{26}$ exceeds the upper limit of the condition (8), said converging surface will have too strong a refractive power, thereby weakening the varifocal function of the second lens unit.

The object side surface of said positive lens element and the diverging surface adjacent thereto arranged in the second lens unit serve also for correcting aberrations, and the correcting function is more remarkable as both the surfaces have a higher total positive refractive power.

It is desirable to design said positive lens element so as to satisfy the following condition (9):

$$2\sqrt{f_W \cdot f_T} < R_{25}/(n_p - n_n) < 5.6 \sqrt{f_W \cdot f_T} \qquad (9)$$

wherein the reference symbol $R_{25}$ represents the radius of curvature on the object side surface of said positive lens element, the reference symbol $n_p$ designates the refractive index of said positive lens element and the reference symbol $n_n$ denotes the refractive index of the negative lens element arranged adjacent to said positive lens element.

If the upper limit of the condition (9) is exceeded, it will be difficult to suppress the variation of coma caused by the variation of focal length to a satisfactory level. If the lower limit of the condition (9) is exceeded, in contrast, it will be obliged to thicken the positive lens element for reserving the required thickness at the marginal portion thereof, thereby enlarging the zoom lens system contrary to the object of the present invention.

Since both the object side surface of said positive lens element and the deverging surface adjacent thereto have the strong refractive powers as already described above, it is desirable to select rather a small difference $\nu_{2n} - \nu_{2p}$ between Abbe's numbers of said negative lens element and the positive lens element so as to satisfy the following condition (10):

$$5 < \nu_{2n} - \nu_{2p} < 25 \qquad (10)$$

If the upper limit of the condition (10) is exceeded, the longitudinal chromatic aberration will be undercorrected and the lateral chromatic aberration will tend to be overcorrected. If the lower limit of the condition (10) is exceeded, in contrast, the longitudinal chromatic aberration will be overcorrected and the lateral chromatic aberration will tend to be undercorrected.

In the next place, the variation of coma to be caused by the variation of focal length can be lessened at a certain degree by composing the third lens unit, in the order from the object side, of a positive lens element, a positive lens element, a negative lens element and a positive lens element, and imparting a diverging function to an air lens which is formed between the object side surface of the negative lens element and the surface adjacent thereto on the object side.

When the radii of curvature on the surfaces which form the air lens, i.e., the object side surface of the negative lens element and the surface adjacent thereto are represented by $R_{35}$ and $R_{34}$ respectively, it is desirable that $R_{35}$ and $R_{34}$ satisfy the following condition (11):

$$-1.0 < R_{35}/R_{34} < 0.8 \tag{11}$$

If the upper limit of the condition (11) is exceeded, it will be difficult to lessen the variation of coma to be caused by the variation of focal length. If the lower limit of the condition (11) is exceeded, in contrast, the spherical aberration will tend to be varied more remarkably than the coma.

In order to lesses the variation of the coma to be caused by the variation of focal length, it is effective to design said negative lens element so as to have adequate thickness $D_{35}$, which should desirably satisfy the following condition (12):

$$0.05 \sqrt{f_W \cdot f_T} < D_{35} < 0.5 \sqrt{f_W \cdot f_T} \tag{12}$$

If the lower limit of the condition (12) is exceeded, it will be difficult to lessen the variation of the coma to be caused by the variation of focal length. If the upper limit of the condition (12) is exceeded, in contrast, the third lens unit will be thickened and the rear lens component will have a large diameter, whereby the zoom lens system will tend to have a long total length.

Further, it is necessary for the lens system according to the present invention or a zoom lens system of the similar type to correct chromatic aberration by the third lens unit only. For this purpose, it is desirable to design the third lens unit so as to satisfy the following condition (13):

$$15 < \nu_{3p} - \nu_{3n} < 35 \tag{13}$$

wherein the reference symbol $\nu_{3p}$ represents the average of the Abbe's numbers of the positive lens elements arranged in the third lens unit and the reference symbol $\nu_{3n}$ designates the average of the Abbe's number(s) of the negative lens element(s) arranged in the third lens unit.

If the upper limit of the condition (13) is exceeded, the lateral chromatic aberration will be overcorrected especially at the wide position and the longitudinal chromatic aberration will tend to be overcorrected at the tele position. If the lower limit of the condition (13) is exceeded, the lateral chromatic aberration will tend to be undercorrected especially at the wide position and the longitudinal chromatic aberration will tend to be undercorrected at the tele position.

Furthermore, the third lens unit may be composed, in the order from the object side, of two or three positive lens elements ad a single negative lens element. When the third lens unit is composed as described above, it is preferable to design the positive lens element arranged on the most object side in the third lens unit so as to have a larger radius of curvature on the object side thereof than that on the image side surface thereof. Speaking more concretely, it is desirable to design said positive lens element so as to satisfy the following condition (14):

$$-1 < (R_{31} + R_{32})/(R_{31} - R_{32}) < 0 \tag{14}$$

wherein the reference symbol $R_{31}$ represents the radius of curvature on the object side surface of said positive lens element and the reference symbol $R_{32}$ designates the radius of curvature on the image side surface of said positive lens element.

If the upper limit of the condition (14) is exceeded, the spherical aberration will tend to be varied remarkably. If the lower limit of the condition (14) is exceeded, the coma will tend to be varied remarkably.

In either of the case where the third lens unit is composed of the positive lens element, the positive lens element and the negative lens element, and the case where the third lens unit is composed of the positive lens element, the positive lens element, the positive lens element and the negative lens element, it is desirable to design the third lens unit so as to satisfy the conditions (12) and (13) in addition to the condition (14).

As for the fourth lens unit, it has a weak refractive power and a function mainly for correction of aberrations. When an aperture ratio not higher than F/2.0 and a vari-focal ratio on the order of 3 are sufficient for a zoom lens system, it is therefore possible to omit the fourth lens unit or design the zoom lens system so as to be composed of only three lens units.

When the zoom lens system according to the present invention is to be composed of the three lens units with the fourth lens unit omitted, it is desirable to design the zoom lens system so as to satisfy the following conditions (15), (16) and (17):

$$-0.5 \sqrt{f_W \cdot f_T} < HF_{III} < 2 \sqrt{f_W \cdot f_T} \tag{15}$$

$$0.2 \sqrt{f_W \cdot f_T} < t_I < 0.45 \sqrt{f_W \cdot f_T} \tag{16}$$

$$0.5\gamma < \beta_{III\,T}/\beta_{III\,W} < 0.7\gamma \tag{17}$$

wherein the reference symbol $HF_{III}$ represents the distance as measured from the object side surface of the third lens unit to the principal point thereof, the reference symbol $t_I$ designates the thickness of the first lens unit as a whole (the distance as measured from the most object side surface of the first lens unit to the most image side surface thereof), the reference symbols $\beta_{III\,T}$ and $\beta_{III\,W}$ denote the magnifications of the third lens unit at the wide position and the tele position respectively, and the reference symbol $\gamma$ represents the zooming ratio of the zoom lens system.

When the fourth lens unit is omitted as described above, $t_{II'}$ used in the condition (2) has a value of O and $HF_{III\,IV}$ used in the condition (1) is coincident with the distance $HF_{III}$ to the front principal point of the third lens unit used in the condition (15). Accordingly, the condition (15) and the condition (16) correspond to the condition (1) and the condition (3) respectively, whereas the condition (2) for the zoom lens system according to the present invention which is composed of the four lens unit does not apply to the zoom lens system which is composed of the three lens units described above. Therefore, the description made on the conditions (1) and (3) applies as it is to the conditions (15) and (16).

The condition (17) defines the ratio between the magnification of the third lens unit at the wide position and that at the tele position. If the upper limit of the condition (17) is exceeded, an advantage is obtained for reducing the diameter of the front lens component, but aberrations will be varied during the variation of focal length more remarkably by the third lens unit than the second lens unit. If the lower limit of the condition (17)

is exceeded, in contrast, almost all the vari-focal function is imparted to the second lens unit, thereby producing an advantage for correction of aberrations, but the aperture stop must be shifted toward the image side for reserving the airspace required to displace the second lens unit for variation of focal length, thereby undesirably enlarging the diameter of the front lens component.

BRIEF DESCRIPTION OF THE DRAWINGS

FIG. 34 through FIG. 36 show curves illustrating aberration characteristics of the Embodiment 8 of the present invention;

DETAILED DESCRIPTION OF THE PREFERRED EMBODIMENTS

Figure 1:
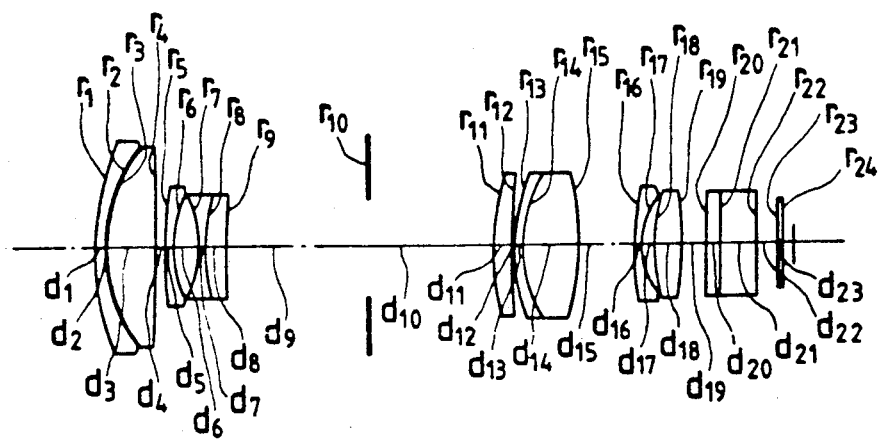
FIG. 1 through FIG. 12 show sectional views illustrating compositions of Embodiments 1 through 12 of the zoom lens system according to the present invention.

Now, the present invention will be described more detailedly below with reference to the preferred embodiments illustrated in the accompanying drawings and given in the form of the following numerical data:

Embodiment 1

$f = 9\ mm \sim 54\ mm$, $F/1.6 \sim 2.99$
$2\omega = 48.8° \sim 9.2°$ $r_1 = 35.2029$
 $d_1 = 1.5000$  $n_1 = 1.84666$  $\nu_1 = 23.78$
$r_2 = 20.7986$
 $d_2 = 0.1200$
$r_3 = 21.2435$
 $d_3 = 6.0000$  $n_2 = 1.71300$  $\nu_2 = 53.84$
$r_4 = -221.6437$
 $d_4 = D_1$ (variable)
$r_5 = 76.6514$
 $d_5 = 0.9000$  $n_3 = 1.72000$  $\nu_3 = 50.25$
$r_6 = 12.9184$
 $d_6 = 3.3000$
$r_7 = -15.3139$
 $d_7 = 0.8000$  $n_4 = 1.56873$  $\nu_4 = 63.16$
$r_8 = 19.6755$
 $d_8 = 2.5000$  $n_5 = 1.84666$  $\nu_5 = 23.78$
$r_9 = 109.6155$
 $d_9 = D_2$ (variable)
$r_{10} = \infty$ (stop)
 $d_{10} = D_3$ (variable)
$r_{11} = 27.0683$
 $d_{11} = 2.6000$  $n_6 = 1.69680$  $\nu_6 = 55.52$
$r_{12} = -1184.3507$ (aspherical surface)
 $d_{12} = 0.2000$
$r_{13} = 26.1745$
 $d_{13} = 1.0000$  $n_7 = 1.80518$  $\nu_7 = 25.43$
$r_{14} = 15.6653$
 $d_{14} = 7.0000$  $n_8 = 1.60311$  $\nu_8 = 60.70$
$r_{15} = -30.7946$ (aspherical surface)
 $d_{15} = D_4$ (variable)
$r_{16} = 37.3383$
 $d_{16} = 1.0000$  $n_9 = 1.80518$  $\nu_9 = 25.43$
$r_{17} = 10.6186$
 $d_{17} = 1.6000$
$r_{18} = 22.8778$
 $d_{18} = 3.5000$  $n_{10} = 1.69680$  $\nu_{10} = 55.52$
$r_{19} = -27.9936$
 $d_{19} = 2.9000$
$r_{20} = \infty$
 $d_{20} = 1.6000$  $n_{11} = 1.51633$  $\nu_{11} = 64.15$
$r_{21} = \infty$
 $d_{21} = 4.4000$  $n_{12} = 1.54771$  $\nu_{12} = 62.83$
$r_{22} = \infty$
 $d_{22} = 2.6000$
$r_{23} = \infty$
 $d_{23} = 0.6000$  $n_{13} = 1.51633$  $\nu_{13} = 64.15$
$r_{24} = \infty$ aspherical surface coefficient
(12th surface)
$A_4 = 0.51861 \times 10^{-5}$, $A_6 = 0.54698 \times 10^{-6}$
$A_8 = -0.18471 \times 10^{-8}$
(15th surface)
$A_4 = 0.42210 \times 10^{-4}$, $A_6 = -0.74263 \times 10^{-6}$
$A_8 = 0.29780 \times 10^{-8}$

| f | 9.27 | 22.035 | 52.38 |
|---|---|---|---|
| $D_1$ | 1.000 | 12.572 | 17.288 |
| $D_2$ | 17.288 | 5.716 | 1.000 |
| $D_3$ | 14.721 | 10.956 | 1.800 |
| $D_4$ | 6.989 | 10.754 | 19.910 |

$HF_{III\ IV}/\sqrt{f_W \cdot f_T} = 0.411$, $t_I/\sqrt{f_W \cdot f_T} = 0.346$ $t_{II}/\sqrt{f_W \cdot f_T} = 0.277$, $\nu_{1p} - \nu_{1n} = 30.06$ $|\phi_{1n}| \cdot \sqrt{f_W \cdot f_T} = 0.350$ $R_{25}/(n_p - n_n)\sqrt{f_W \cdot f_T} = 3.21$

Embodiment 2

$f = 9\ mm \sim 54\ mm$, $F/1.56 \sim 2.31$
$2\omega = 48.8° \sim 9.2°$ $r_1 = 26.3524$
 $d_1 = 1.5000$  $n_1 = 1.84666$  $\nu_1 = 23.78$
$r_2 = 19.2969$
 $d_2 = 0.1600$
$r_3 = 19.8317$
 $d_3 = 5.7000$  $n_2 = 1.69680$  $\nu_2 = 55.52$
$r_4 = 159.5293$
 $d_4 = D_1$ (variable)
$r_5 = 96.7480$
 $d_5 = 0.9000$  $n_3 = 1.83400$  $\nu_3 = 37.16$ -continued

| | | | |
|---|---|---|---|
| $r_6 = 11.2280$ | | | |
| | $d_6 = 3.2000$ | | |
| $r_7 = -17.3804$ | | | |
| | $d_7 = 0.8000$ | $n_4 = 1.63854$ | $\nu_4 = 55.38$ |
| $r_8 = 16.8698$ | | | |
| | $d_8 = 3.2000$ | $n_5 = 1.84666$ | $\nu_5 = 23.78$ |
| $r_9 = -73.6884$ | | | |
| | $d_9 = D_2$ (variable) | | |
| $r_{10} = \infty$ (stop) | | | |
| | $d_{10} = D_3$ (variable) | | |
| $r_{11} = 41.7164$ | | | |
| | $d_{11} = 3.1000$ | $n_6 = 1.69680$ | $\nu_6 = 55.52$ |
| $r_{12} = -39.8526$ | | | |
| | $d_{12} = 0.2000$ | | |
| $r_{13} = 18.2916$ | | | |
| | $d_{13} = 3.3000$ | $n_7 = 1.60311$ | $\nu_7 = 60.70$ |
| $r_{14} = 664.7190$ | | | |
| | $d_{14} = 1.0000$ | | |
| $r_{15} = -29.5242$ | | | |
| | $d_{15} = 1.0000$ | $n_8 = 1.84666$ | $\nu_8 = 23.78$ |
| $r_{16} = 36.9394$ | | | |
| | $d_{16} = 3.4000$ | $n_9 = 1.69680$ | $\nu_9 = 55.52$ |
| $r_{17} = -30.8119$ | | | |
| | $d_{17} = D_4$ (variable) | | |
| $r_{18} = 23.5455$ | | | |
| | $d_{18} = 1.0000$ | $n_{10} = 1.80100$ | $\nu_{10} = 34.97$ |
| $r_{19} = 9.1620$ | | | |
| | $d_{19} = 1.0000$ | | |
| $r_{20} = 14.0184$ | | | |
| | $d_{20} = 3.0000$ | $n_{11} = 1.74950$ | $\nu_{11} = 35.27$ |
| $r_{21} = -106.8065$ | | | |
| | $d_{21} = 1.8000$ | | |
| $r_{22} = \infty$ | | | |
| | $d_{22} = 1.6000$ | $n_{12} = 1.51633$ | $\nu_{12} = 64.15$ |
| $r_{23} = \infty$ | | | |
| | $d_{23} = 4.4000$ | $n_{13} = 1.54771$ | $\nu_{13} = 62.83$ |
| $r_{24} = \infty$ | | | |
| | $d_{24} = 2.6000$ | | |
| $r_{25} = \infty$ | | | |
| | $d_{25} = 0.6000$ | $n_{14} = 1.51633$ | $\nu_{14} = 64.15$ |
| $r_{26} = \infty$ | | | |

| f | 9.27 | 22.035 | 52.38 |
|---|---|---|---|
| $D_1$ | 1.000 | 12.502 | 19.946 |
| $D_2$ | 19.946 | 8.444 | 1.000 |
| $D_3$ | 11.038 | 6.749 | 0.732 |
| $D_4$ | 6.989 | 11.279 | 17.295 |

$HF_{III,IV}/\sqrt{f_W \cdot f_T} = 0.379, \quad t_I/\sqrt{f_W \cdot f_T} = 0.334$ $t_{IV}/\sqrt{f_W \cdot f_T} = 0.227, \quad \nu_{1p} - \nu_{1n} = 31.74$ $|\phi_{1n}| \cdot \sqrt{f_W \cdot f_T} = 0.234$ $\nu_{4p} - \nu_{4n} = 0.3, \quad R_{26}/\sqrt{f_W \cdot f_T} = -3.34$ $R_{25}/(n_p - n_n)\sqrt{f_W \cdot f_T} = 3.68 \quad \nu_{2n} - \nu_{2p} = 22.49$ $R_{35}/R_{34} = -0.04, \quad \nu_{3p} - \nu_{3n} = 33.47$

Embodiment 3 f = 9 mm ~ 54 mm,  F/1.56 ~ 2.31
$2\omega = 48.8° \sim 9.2°$

| | | | |
|---|---|---|---|
| $r_1 = 27.5339$ | | | |
| | $d_1 = 1.5000$ | $n_1 = 1.84666$ | $\nu_1 = 23.78$ |
| $r_2 = 19.2203$ | | | |
| | $d_2 = 0.1600$ | | |
| $r_3 = 19.6352$ | | | |
| | $d_3 = 5.7000$ | $n_2 = 1.71300$ | $\nu_2 = 53.84$ |
| $r_4 = 170.0287$ | | | |
| | $d_4 = D_1$ (variable) | | |
| $r_5 = 60.1293$ | | | |
| | $d_5 = 0.9000$ | $n_3 = 1.83400$ | $\nu_3 = 37.16$ |
| $r_6 = 10.9451$ | | | |

-continued

| | | | |
|---|---|---|---|
| | $d_6 = 3.2000$ | | |
| $r_7 = -18.5112$ | | | |
| | $d_7 = 0.8000$ | $n_4 = 1.63854$ | $\nu_4 = 55.38$ |
| $r_8 = 16.2958$ | | | |
| | $d_8 = 3.2000$ | $n_5 = 1.84666$ | $\nu_5 = 23.78$ |
| $r_9 = -100.1631$ | | | |
| | $d_9 = D_2$ (variable) | | |
| $r_{10} = \infty$ (stop) | | | |
| | $d_{10} = D_3$ (variable) | | |
| $r_{11} = 38.4186$ | | | |
| | $d_{11} = 3.1000$ | $n_6 = 1.69680$ | $\nu_6 = 55.52$ |
| $r_{12} = -51.2382$ | | | |
| | $d_{12} = 0.2000$ | | |
| $r_{13} = 17.0011$ | | | |
| | $d_{13} = 3.3000$ | $n_7 = 1.60311$ | $\nu_7 = 60.70$ |
| $r_{14} = 258.8131$ | | | |
| | $d_{14} = 1.0000$ | | |
| $r_{15} = -29.8674$ | | | |
| | $d_{15} = 1.0000$ | $n_8 = 1.84666$ | $\nu_8 = 23.78$ |
| $r_{16} = 35.4843$ | | | |
| | $d_{16} = 3.4000$ | $n_9 = 1.69680$ | $\nu_9 = 55.52$ |
| $r_{17} = -30.5387$ | | | |
| | $d_{17} = D_4$ | | |
| $r_{18} = 242.5055$ | | | |
| | $d_{18} = 3.0000$ | $n_{10} = 1.74950$ | $\nu_{10} = 35.27$ |
| $r_{19} = -13.9740$ | | | |
| | $d_{19} = 1.0000$ | | |
| $r_{20} = -9.7090$ | | | |
| | $d_{20} = 1.0000$ | $n_{11} = 1.80100$ | $\nu_{11} = 34.97$ |
| $r_{21} = -25.6445$ | | | |
| | $d_{21} = 1.5000$ | | |
| $r_{22} = \infty$ | | | |
| | $d_{22} = 1.6000$ | $n_{12} = 1.51633$ | $\nu_{12} = 64.15$ |
| $r_{23} = \infty$ | | | |
| | $d_{23} = 4.4000$ | $n_{13} = 1.54771$ | $\nu_{13} = 62.83$ |
| $r_{24} = \infty$ | | | |
| | $d_{24} = 1.5000$ | | |
| $r_{25} = \infty$ | | | |
| | $d_{25} = 0.6000$ | $n_{14} = 1.51633$ | $\nu_{14} = 64.15$ |
| $r_{26} = \infty$ | | | |

| f | 9.27 | 22.035 | 52.38 |
|---|---|---|---|
| $D_1$ | 1.000 | 12.575 | 19.842 |
| $D_2$ | 19.842 | 8.267 | 1.000 |
| $D_3$ | 11.023 | 6.599 | 0.019 |
| $D_4$ | 6.989 | 11.414 | 17.994 |

$HF_{III,IV}/\sqrt{f_W \cdot f_T} = 0.248, \quad t_I/\sqrt{f_W \cdot f_T} = 0.334$ $t_{IV}/\sqrt{f_W \cdot f_T} = 0.227, \quad \nu_{1p} - \nu_{1n} = 30.06$ $|\phi_{1n}| \cdot \sqrt{f_W \cdot f_T} = 0.269$ $\nu_{4p} - \nu_{4n} = 0.3, \quad R_{26}/\sqrt{f_W \cdot f_T} = -4.55$ $R_{25}/(n_p - n_n)\sqrt{f_W \cdot f_T} = 3.55, \quad \nu_{2n} - \nu_{2p} = 22.49$ $R_{35}/R_{34} = -0.12, \quad D_{35}/\sqrt{f_W \cdot f_T} = 0.25$
$\nu_{3p} - \nu_{3n} = 33.47$

Embodiment 4 f = 9 mm ~ 54 mm,  F/1.5 ~ 2.27
$2\omega = 48.8° \sim 9.2°$

| | | | |
|---|---|---|---|
| $r_1 = 119.4754$ | | | |
| | $d_1 = 1.5000$ | $n_1 = 1.84666$ | $\nu_1 = 23.78$ |
| $r_2 = 43.2372$ | | | |
| | $d_2 = 0.4000$ | | |
| $r_3 = 54.7653$ | | | |
| | $d_3 = 3.2000$ | $n_2 = 1.60311$ | $\nu_2 = 60.70$ |
| $r_4 = -254.7500$ | | | |
| | $d_4 = 0.2000$ | | |
| $r_5 = 31.6910$ | | | |
| | $d_5 = 3.4000$ | $n_3 = 1.72000$ | $\nu_3 = 50.25$ |

-continued

| | | | |
|---|---|---|---|
| $r_6 = 297.4947$ | | | |
| | $d_6 = D_1$ (variable) | | |
| $r_7 = 1667.8492$ | | | |
| | $d_7 = 0.9000$ | $n_4 = 1.83400$ | $\nu_4 = 37.16$ |
| $r_8 = 12.9936$ | | | |
| | $d_8 = 2.6500$ | | |
| $r_9 = -20.7415$ | | | |
| | $d_9 = 0.8000$ | $n_5 = 1.63854$ | $\nu_5 = 55.38$ |
| $r_{10} = 15.6937$ | | | |
| | $d_{10} = 3.5000$ | $n_6 = 1.84666$ | $\nu_6 = 23.78$ |
| $r_{11} = -142.7071$ | | | |
| | $d_{11} = D_2$ (variable) | | |
| $r_{12} = \infty$ (stop) | | | |
| | $d_{12} = D_3$ (variable) | | |
| $r_{13} = 35.2771$ | | | |
| | $d_{13} = 3.6000$ | $n_7 = 1.70154$ | $\nu_7 = 41.21$ |
| $r_{14} = -42.6217$ | | | |
| | $d_{14} = 0.2000$ | | |
| $r_{15} = 20.2984$ | | | |
| | $d_{15} = 3.2000$ | $n_8 = 1.60311$ | $\nu_8 = 60.70$ |
| $r_{16} = 107.9479$ | | | |
| | $d_{16} = 1.5700$ | | |
| $r_{17} = -30.2741$ | | | |
| | $d_{17} = 1.0000$ | $n_9 = 1.84666$ | $\nu_9 = 23.78$ |
| $r_{18} = 18.2629$ | | | |
| | $d_{18} = 5.8000$ | $n_{10} = 1.70154$ | $\nu_{10} = 41.21$ |
| $r_{19} = -28.3801$ | | | |
| | $d_{19} = D_4$ (variable) | | |
| $r_{20} = 38.3921$ | | | |
| | $d_{20} = 3.7000$ | $n_{11} = 1.76200$ | $\nu_{11} = 40.10$ |
| $r_{21} = -15.0610$ | | | |
| | $d_{21} = 0.5000$ | | |
| $r_{22} = -11.7076$ | | | |
| | $d_{22} = 1.0000$ | $n_{12} = 1.80100$ | $\nu_{12} = 34.97$ |
| $r_{23} = -100.6666$ | | | |
| | $d_{23} = 1.0000$ | | |
| $r_{24} = \infty$ | | | |
| | $d_{24} = 1.6000$ | $n_{13} = 1.51633$ | $\nu_{13} = 64.15$ |
| $r_{25} = \infty$ | | | |
| | $d_{25} = 4.4000$ | $n_{14} = 1.54771$ | $\nu_{14} = 62.83$ |
| $r_{26} = \infty$ | | | |
| | $d_{26} = 1.0000$ | | |
| $r_{27} = \infty$ | | | |
| | $d_{27} = 0.6000$ | $n_{15} = 1.51633$ | $\nu_{15} = 64.15$ |
| $r_{28} = \infty$ | | | |

| f | 9.27 | 22.035 | 52.38 |
|---|---|---|---|
| $D_1$ | 1.000 | 12.252 | 19.278 |
| $D_2$ | 19.278 | 8.026 | 1.000 |
| $D_3$ | 14.637 | 9.499 | 1.913 |
| $D_4$ | 10.124 | 15.262 | 22.849 |

$HF_{III,IV}/\sqrt{f_W \cdot f_T} = 0.360$, $t_I/\sqrt{f_W \cdot f_T} = 0.395$ $t_{II}/\sqrt{f_W \cdot f_T} = 0.236$, $\nu_{1p} - \nu_{1n} = 31.695$ $\phi_{1n} \cdot \sqrt{f_W \cdot f_T} = 0.273$, $\phi_{1p1}/\phi_{1p2} = 0.653$ $\nu_{4p} - \nu_{4n} = 5.13$, $R_{26}/\sqrt{f_W \cdot f_T} = -6.48$ $R_{25}/(n_p - n_n)\sqrt{f_W \cdot f_T} = 3.42$, $\nu_{2n} - \nu_{2p} = 22.49$ $R_{35}/R_{34} = -0.28$, $D_{35}/\sqrt{f_W \cdot f_T} = 0.12$ $\nu_{3p} - \nu_{3n} = 23.93$ Embodiment 5 f = 10 mm ~ 27 mm, F/2.33 ~ 2.67
2ω = 44.4° ~ 18.2°

| | | | |
|---|---|---|---|
| $r_1 = 25.5444$ | | | |
| | $d_1 = 1.5000$ | $n_1 = 1.84666$ | $\nu_1 = 23.78$ |
| $r_2 = 15.6418$ | | | |
| | $d_2 = 0.2700$ | | |
| $r_3 = 17.3749$ | | | |
| | $d_3 = 4.0000$ | $n_2 = 1.69680$ | $\nu_2 = 55.52$ |
| $r_4 = -69.0299$ | | | |
| | $d_4 = D_1$ (variable) | | |
| $r_5 = 395.7212$ | | | |
| | $d_5 = 0.9000$ | $n_3 = 1.72000$ | $\nu_3 = 50.25$ |
| $r_6 = 11.8571$ | | | |
| | $d_6 = 1.7400$ | | |
| $r_7 = -10.3805$ | | | |
| | $d_7 = 0.8000$ | $n_4 = 1.62280$ | $\nu_4 = 57.06$ |
| $r_8 = 17.2915$ | | | |
| | $d_8 = 1.8500$ | $n_5 = 1.84666$ | $\nu_5 = 23.78$ |
| $r_9 = -62.4366$ | | | |
| | $d_9 = D_2$ (variable) | | |
| $r_{10} = \infty$ (stop) | | | |
| | $d_{10} = D_3$ (variable) | | |
| $r_{11} = 15.8400$ | | | |
| | $d_{11} = 2.5000$ | $n_6 = 1.69680$ | $\nu_6 = 55.52$ |
| $r_{12} = -31.0270$ | | | |
| | $d_{12} = 0.2000$ | | |
| $r_{13} = 12.3184$ | | | |
| | $d_{13} = 3.9771$ | $n_7 = 1.60311$ | $\nu_7 = 60.70$ |
| $r_{14} = -40.7505$ | | | |
| | $d_{14} = 0.3600$ | | |
| $r_{15} = -15.8226$ | | | |
| | $d_{15} = 5.5621$ | $n_8 = 1.80518$ | $\nu_8 = 25.43$ |
| $r_{16} = 8.5694$ | | | |
| | $d_{16} = 0.6600$ | | |
| $r_{17} = 23.6229$ | | | |
| | $d_{17} = 3.0000$ | $n_9 = 1.83400$ | $\nu_9 = 37.16$ |
| $r_{18} = -14.6232$ | | | |
| | $d_{18} = D_4$ (variable) | | |
| $r_{19} = \infty$ | | | |
| | $d_{19} = 1.6000$ | $n_{10} = 1.51633$ | $\nu_{10} = 64.15$ |
| $r_{20} = \infty$ | | | |
| | $d_{20} = 4.4000$ | $n_{11} = 1.54771$ | $\nu_{11} = 62.83$ |
| $r_{21} = \infty$ | | | |
| | $d_{21} = 2.6000$ | | |
| $r_{22} = \infty$ | | | |
| | $d_{22} = 0.6000$ | $n_{12} = 1.51633$ | $\nu_{12} = 64.15$ |
| $r_{23} = \infty$ | | | |

| f | 10.300 | 16.410 | 26.190 |
|---|---|---|---|
| $D_1$ | 1.000 | 5.595 | 10.062 |
| $D_2$ | 10.062 | 5.467 | 1.000 |
| $D_3$ | 4.213 | 2.741 | 1.800 |
| $D_4$ | 1.000 | 2.472 | 3.413 |

$HF_{III,IV}/\sqrt{f_W \cdot f_T} = 0.145$, $t_I/\sqrt{f_W \cdot f_T} = 0.351$ $t_{II}/\sqrt{f_W \cdot f_T} = 0.531$, $\nu_{1p} - \nu_{1n} = 31.74$ $\phi_{1n} \cdot \sqrt{f_W \cdot f_T} = 0.321$ Embodiment 6 f = 10 mm ~ 27 mm, F/2.3 ~ 2.66
2ω = 44.4° ~ 18.2°

| | | | |
|---|---|---|---|
| $r_1 = 25.1679$ | | | |
| | $d_1 = 1.5000$ | $n_1 = 1.84666$ | $\nu_1 = 23.78$ |
| $r_2 = 13.6950$ | | | |
| | $d_2 = 0.2500$ | | |
| $r_3 = 14.8428$ | | | |
| | $d_3 = 4.4000$ | $n_2 = 1.78590$ | $\nu_2 = 44.18$ |
| $r_4 = -104.4048$ | | | |
| | $d_4 = D_1$ (variable) | | |
| $r_5 = 31.2720$ | | | |
| | $d_5 = 0.9000$ | $n_3 = 1.83400$ | $\nu_3 = 37.16$ |
| $r_6 = 8.1006$ | | | |
| | $d_6 = 2.1100$ | | |
| $r_7 = -8.4781$ | | | |
| | $d_7 = 0.8000$ | $n_4 = 1.62230$ | $\nu_4 = 53.20$ |
| $r_8 = 12.1584$ | | | |
| | $d_8 = 2.2000$ | $n_5 = 1.84666$ | $\nu_5 = 23.78$ |
| $r_9 = -37.5548$ | | | |
| | $d_9 = D_2$ (variable) | | |

-continued

| | | | |
|---|---|---|---|
| $r_{10} = \infty$ (stop) | | | |
| | $d_{10} = D_3$ (variable) | | |
| $r_{11} = 13.8345$ | | | |
| | $d_{11} = 3.0000$ | $n_6 = 1.80610$ | $\nu_6 = 40.95$ |
| $r_{12} = -25.0010$ | | | |
| | $d_{12} = 0.3300$ | | |
| $r_{13} = -14.3814$ | | | |
| | $d_{13} = 6.0000$ | $n_7 = 1.80518$ | $\nu_7 = 25.43$ |
| $r_{14} = 16.9003$ | | | |
| | $d_{14} = 0.7700$ | | |
| $r_{15} = 182.2337$ | | | |
| | $d_{15} = 2.7000$ | $n_8 = 1.61700$ | $\nu_8 = 62.79$ |
| $r_{16} = -14.2223$ | | | |
| | $d_{16} = 0.2000$ | | |
| $r_{17} = 20.1274$ | | | |
| | $d_{17} = 3.0000$ | $n_9 = 1.56873$ | $\nu_9 = 63.16$ |
| $r_{18} = -37.0475$ | | | |
| | $d_{18} = D_4$ (variable) | | |
| $r_{19} = \infty$ | | | |
| | $d_{19} = 1.6000$ | $n_{10} = 1.51633$ | $\nu_{10} = 64.15$ |
| $r_{20} = \infty$ | | | |
| | $d_{20} = 4.4000$ | $n_{11} = 1.54771$ | $\nu_{11} = 62.83$ |
| $r_{21} = \infty$ | | | |
| | $d_{21} = 11.5000$ | | |
| $r_{22} = \infty$ | | | |
| | $d_{22} = 0.6000$ | $n_{12} = 1.51633$ | $\nu_{12} = 64.15$ |
| $r_{23} = \infty$ | | | |

| f | 10.300 | 16.398 | 26.190 |
|---|---|---|---|
| $D_1$ | 1.000 | 5.103 | 8.934 |
| $D_2$ | 8.934 | 4.831 | 1.000 |
| $D_3$ | 5.052 | 3.176 | 1.800 |
| $D_4$ | 1.000 | 2.876 | 4.252 |

$HF_{III\ IV}/\sqrt{f_W \cdot f_T} = 0.439$, $t_I/\sqrt{f_W \cdot f_T} = 0.374$ $T_{IV}/\sqrt{f_W \cdot f_T} = 0.537$, $\nu_{1p} - \nu_{1n} = 20.4$ $\phi_{1n} \cdot \sqrt{f_W \cdot f_T} = 0.435$

Embodiment 7

$f = 6\ mm \sim 36\ mm$, $F/2.0 \sim 3.0$
$2\omega = 50.2° \sim 9.4°$

| | | | |
|---|---|---|---|
| $r_1 = \infty$ | | | |
| | $d_1 = 1.2000$ | $n_1 = 1.80518$ | $\nu_1 = 25.43$ |
| $r_2 = 56.7851$ | | | |
| | $d_2 = 2.4000$ | $n_2 = 1.60311$ | $\nu_2 = 60.70$ |
| $r_3 = -161.4902$ | | | |
| | $d_3 = 0.2000$ | | |
| $r_4 = 29.8795$ | | | |
| | $d_4 = 2.5000$ | $n_3 = 1.72000$ | $\nu_3 = 50.25$ |
| $r_5 = 198.0057$ | | | |
| | $d_5 = D_1$ (variable) | | |
| $r_6 = -143.3755$ | | | |
| | $d_6 = 0.8000$ | $n_4 = 1.83400$ | $\nu_4 = 37.16$ |
| $r_7 = 10.4625$ | | | |
| | $d_7 = 1.6400$ | | |
| $r_8 = -24.0267$ | | | |
| | $d_8 = 0.7000$ | $n_5 = 1.69680$ | $\nu_5 = 55.52$ |
| $r_9 = 9.7268$ | | | |
| | $d_9 = 2.6000$ | $n_6 = 1.84666$ | $\nu_6 = 23.78$ |
| $r_{10} = -196.20001$ | | | |
| | $d_{10} = D_2$ (variable) | | |
| $r_{11} = \infty$ (stop) | | | |
| | $d_{11} = D_3$ (variable) | | |
| $r_{12} = 15.1505$ | | | |
| | $d_{12} = 2.7000$ | $n_7 = 1.70154$ | $\nu_7 = 41.21$ |
| $r_{13} = -31.1033$ | | | |
| | $d_{13} = 0.1500$ | | |
| $r_{14} = 11.4090$ | | | |
| | $d_{14} = 2.5000$ | $n_8 = 1.62299$ | $\nu_8 = 58.14$ |
| $r_{15} = 93.5986$ | | | |
| | $d_{15} = 0.6400$ | | |
| $r_{16} = -20.8467$ | | | |
| | $d_{16} = 0.8000$ | $n_9 = 1.84666$ | $\nu_9 = 23.78$ |

-continued

| | | | |
|---|---|---|---|
| $r_{17} = 6.8113$ | | | |
| | $d_{17} = 4.0000$ | $n_{10} = 1.70154$ | $\nu_{10} = 41.21$ |
| $r_{18} = -22.5291$ | | | |
| | $d_{18} = D_4$ (variable) | | |
| $r_{19} = 32.6140$ | | | |
| | $d_{19} = 1.0000$ | $n_{11} = 1.75700$ | $\nu_{11} = 47.87$ |
| $r_{20} = 6.3891$ | | | |
| | $d_{20} = 0.7000$ | | |
| $r_{21} = 15.2540$ | | | |
| | $d_{21} = 2.1000$ | $n_{12} = 1.75520$ | $\nu_{12} = 27.51$ |
| $r_{22} = -33.3263$ | | | |
| | $d_{22} = 3.0000$ | | |
| $r_{23} = \infty$ | | | |
| | $d_{23} = 3.5000$ | $n_{13} = 1.54771$ | $\nu_{13} = 62.83$ |
| $r_{24} = \infty$ | | | |
| | $d_{24} = 1.0000$ | | |
| $r_{25} = \infty$ | | | |
| | $d_{25} = 0.6000$ | $n_{14} = 1.51633$ | $\nu_{14} = 64.15$ |
| $r_{26} = \infty$ | | | |

| f | 6.180 | 14.690 | 34.918 |
|---|---|---|---|
| $D_1$ | 1.200 | 12.898 | 19.820 |
| $D_2$ | 19.620 | 7.922 | 1.000 |
| $D_3$ | 7.878 | 5.706 | 1.680 |
| $D_4$ | 1.000 | 3.171 | 7.197 |

$HF_{III\ IV}/\sqrt{f_W \cdot f_T} = -0.0701$, $t_{IV}/\sqrt{f_W \cdot f_T} = 0.2587$ $t_I/\sqrt{f_W \cdot f_T} = 0.4289$, $R_{26}/\sqrt{f_W \cdot f_T} = -13.356$ $R_{25}/(n_p - n_n)\sqrt{f_W \cdot f_T} = 4.418$ $\nu_{2n} - \nu_{2p} = 22.56$, $R_{35}/R_{34} = -0.2227$ $D_{35}/\sqrt{f_W \cdot f_T} = 0.0545$, $\nu_{3p} - \nu_{3n} = 23.07$ $\nu_{4p} - \nu_{4n} = -20.36$, $\sqrt{f_W \cdot f_T}/f_{IV} = -0.2443$ $\nu_{1p} - \nu_{1n} = 30.045$, $\phi_{1n} \cdot \sqrt{f_W \cdot f_T} = 0.2083$
$\phi_{1f1}/\phi_{1f2} = 0.6944$

Embodiment 8

$f = 6\ mm \sim 36\ mm$, $F/2.0 \sim 3.0$
$2\omega = 50.2° \sim 9.4°$

| | | | |
|---|---|---|---|
| $r_1 = 31.2146$ | | | |
| | $d_1 = 1.2000$ | $n_1 = 1.84666$ | $\nu_1 = 23.78$ |
| $r_2 = 21.6454$ | | | |
| | $d_2 = 0.0600$ | | |
| $r_3 = 22.1743$ | | | |
| | $d_3 = 3.5000$ | $n_2 = 1.72916$ | $\nu_2 = 54.68$ |
| $r_4 = -796.4660$ | | | |
| | $d_4 = D_1$ (variable) | | |
| $r_5 = -1267.1743$ | | | |
| | $d_5 = 0.8000$ | $n_3 = 1.83400$ | $\nu_3 = 37.16$ |
| $r_6 = 9.6413$ | | | |
| | $d_6 = 1.9100$ | | |
| $r_7 = -13.9370$ | | | |
| | $d_7 = 0.7000$ | $n_4 = 1.69680$ | $\nu_4 = 55.52$ |
| $r_8 = 11.6953$ | | | |
| | $d_8 = 2.6000$ | $n_5 = 1.84666$ | $\nu_5 = 23.78$ |
| $r_9 = -41.5358$ | | | |
| | $d_9 = D_2$ (variable) | | |
| $r_{10} = \infty$ (stop) | | | |
| | $d_{10} = D_3$ (variable) | | |
| $r_{11} = 19.7110$ | | | |
| | $d_{11} = 2.7000$ | $n_6 = 1.70154$ | $\nu_6 = 41.21$ |
| $r_{12} = -32.0635$ | | | |
| | $d_{12} = 0.1500$ | | |
| $r_{13} = 11.4825$ | | | |
| | $d_{13} = 2.5000$ | $n_7 = 1.62299$ | $\nu_7 = 58.14$ |
| $r_{14} = 128.6507$ | | | |
| | $d_{14} = 0.6600$ | | |

-continued

| | | | |
|---|---|---|---|
| $r_{15} = -20.3963$ | | | |
| | $d_{15} = 0.8000$ | $n_8 = 1.84666$ | $\nu_8 = 23.78$ |
| $r_{16} = 7.2420$ | | | |
| | $d_{16} = 4.4000$ | $n_9 = 1.70154$ | $\nu_9 = 41.21$ |
| $r_{17} = -16.8465$ | | | |
| | $d_{17} = D_4$ (variable) | | |
| $r_{18} = 37.5428$ | | | |
| | $d_{18} = 1.0000$ | $n_{10} = 1.75700$ | $\nu_{10} = 47.87$ |
| $r_{19} = 7.3588$ | | | |
| | $d_{19} = 0.8300$ | | |
| $r_{20} = 21.8186$ | | | |
| | $d_{20} = 2.1000$ | $n_{11} = 1.76182$ | $\nu_{11} = 26.52$ |
| $r_{21} = -23.6693$ | | | |
| | $d_{21} = 4.5000$ | | |
| $r_{22} = \infty$ | | | |
| | $d_{22} = 3.5000$ | $n_{12} = 1.54771$ | $\nu_{12} = 62.83$ |
| $r_{23} = \infty$ | | | |
| | $d_{23} = 1.0000$ | | |
| $r_{24} = \infty$ | | | |
| | $d_{24} = 0.6000$ | $n_{13} = 1.51633$ | $\nu_{13} = 64.15$ |
| $r_{25} = \infty$ | | | |

| f | 6.180 | 14.690 | 34.917 |
|---|---|---|---|
| $D_1$ | 1.100 | 12.039 | 18.466 |
| $D_2$ | 18.366 | 7.426 | 1.000 |
| $D_3$ | 8.356 | 6.020 | 1.500 |
| $D_4$ | 1.000 | 3.336 | 7.855 |

$HF_{III,IV}/\sqrt{f_W \cdot f_T} = 0.1566$, $t_{II}/\sqrt{f_W \cdot f_T} = 0.2675$ $t_I/\sqrt{f_W \cdot f_T} = 0.3240$, $R_{26}/\sqrt{f_W \cdot f_T} = -2.827$ $R_{25}/(n_F - n_n)\sqrt{f_W \cdot f_T} = 5.313$ $\nu_{2F} - \nu_{2n} = 22.56$, $R_{35}/R_{34} = -0.1585$ $D_{35}/\sqrt{f_W \cdot f_T} = 0.0545$, $\nu_{3F} - \nu_{3n} = 23.07$ $\nu_{4F} - \nu_{4n} = -21.35$, $\sqrt{f_W \cdot f_T}/f_{II} = -0.1313$ $\nu_{1F} - \nu_{1n} = 30.9$, $\phi_{1n}\sqrt{f_W \cdot f_T} = 0.1660$

Embodiment 9

$f = 6$ mm ~ 36 mm.  F/2.0 ~ 3.5
$2\omega = 50.2° \sim 9.4°$

| | | | |
|---|---|---|---|
| $r_1 = 23.7980$ | | | |
| | $d_1 = 1.2000$ | $n_1 = 1.84666$ | $\nu_1 = 23.78$ |
| $r_2 = 18.4494$ | | | |
| | $d_2 = 0.1200$ | | |
| $r_3 = 19.1669$ | | | |
| | $d_3 = 3.7000$ | $n_2 = 1.72916$ | $\nu_2 = 54.68$ |
| $r_4 = 129.3407$ | | | |
| | $d_4 = D_1$ (variable) | | |
| $r_5 = 74.9820$ | | | |
| | $d_5 = 0.9000$ | $n_3 = 1.83400$ | $\nu_3 = 37.16$ |
| $r_6 = 7.9166$ | | | |
| | $d_6 = 2.6900$ | | |
| $r_7 = -13.5440$ | | | |
| | $d_7 = 0.8000$ | $n_4 = 1.62606$ | $\nu_4 = 39.21$ |
| $r_8 = 9.8227$ | | | |
| | $d_8 = 3.2000$ | $n_5 = 1.80518$ | $\nu_5 = 25.43$ |
| $r_9 = -27.6825$ | | | |
| | $d_9 = D_2$ (variable) | | |
| $r_{10} = \infty$ (stop) | | | |
| | $d_{10} = D_3$ (variable) | | |
| $r_{11} = 14.8485$ | | | |
| | $d_{11} = 2.6000$ | $n_6 = 1.78590$ | $\nu_6 = 44.18$ |
| $r_{12} = -59.1678$ | | | |
| | $d_{12} = 0.1500$ | | |
| $r_{13} = 15.8224$ | | | |
| | $d_{13} = 3.8000$ | $n_7 = 1.60311$ | $\nu_7 = 60.70$ |
| $r_{14} = -11.5860$ | | | |

-continued

| | | | |
|---|---|---|---|
| | $d_{14} = 0.8000$ | $n_8 = 1.84666$ | $\nu_8 = 23.78$ |
| $r_{15} = 20.6356$ | | | |
| | $d_{15} = D_4$ (variable) | | |
| $r_{16} = 12.4862$ | | | |
| | $d_{16} = 1.0000$ | $n_9 = 1.68893$ | $\nu_9 = 31.08$ |
| $r_{17} = 7.3928$ | | | |
| | $d_{17} = 0.7200$ | | |
| $r_{18} = 14.0765$ | | | |
| | $d_{18} = 2.3000$ | $n_{10} = 1.80518$ | $\nu_{10} = 25.43$ |
| $r_{19} = -66.8817$ | | | |
| | $d_{19} = 4.5250$ | | |
| $r_{20} = \infty$ | | | |
| | $d_{20} = 3.5000$ | $n_{11} = 1.54771$ | $\nu_{11} = 62.83$ |
| $r_{21} = \infty$ | | | |
| | $d_{21} = 1.0000$ | | |
| $r_{22} = \infty$ | | | |
| | $d_{22} = 0.6000$ | $n_{12} = 1.51633$ | $\nu_{12} = 64.15$ |
| $r_{23} = \infty$ | | | |

| f | 6.180 | 14.690 | 34.919 |
|---|---|---|---|
| $D_1$ | 1.000 | 11.168 | 17.753 |
| $D_2$ | 17.753 | 7.585 | 1.000 |
| $D_3$ | 11.661 | 7.626 | 1.500 |
| $D_4$ | 1.000 | 5.035 | 11.161 |

$HF_{III,IV}/\sqrt{f_W \cdot f_T} = 0.5745$, $t_{II}/\sqrt{f_W \cdot f_T} = 0.2737$ $t_I/\sqrt{f_W \cdot f_T} = 0.3417$, $R_{26}/\sqrt{f_W \cdot f_T} = -1.884$ $R_{25}/(n_F - n_n)\sqrt{f_W \cdot f_T} = 3.733$ $\nu_{2F} - \nu_{2n} = 12.755$, $D_{35}/\sqrt{f_W \cdot f_T} = 0.0545$ $\nu_{3F} - \nu_{3n} = 28.66$
$(R_{31} + R_{32})/(R_{31} - R_{32}) = -0.5988$ $\nu_{4F} - \nu_{4n} = -5.65$ $\sqrt{f_W \cdot f_T}/f_{II} = 0.4909$ $\nu_{1F} - \nu_{1n} = 30.9$, $\phi_{1n}\sqrt{f_W \cdot f_T} = 0.1359$

Embodiment 10

$f = 6$ mm ~ 36 mm.  F/2.0 ~ 3.2
$2\omega = 50.2° \sim 9.4°$

| | | | |
|---|---|---|---|
| $r_1 = 27.4156$ | | | |
| | $d_1 = 1.2000$ | $n_1 = 1.84666$ | $\nu_1 = 23.78$ |
| $r_2 = 17.5554$ | | | |
| | $d_2 = 3.7000$ | $n_2 = 1.72916$ | $\nu_2 = 54.68$ |
| $r_3 = 299.8897$ | | | |
| | $d_3 = D_1$ (variable) | | |
| $r_4 = -328.5711$ | | | |
| | $d_4 = 0.8000$ | $n_3 = 1.83400$ | $\nu_3 = 37.16$ |
| $r_5 = 8.7329$ | | | |
| | $d_5 = 1.9800$ | | |
| $r_6 = -11.3687$ | | | |
| | $d_6 = 0.7000$ | $n_4 = 1.72342$ | $\nu_4 = 38.03$ |
| $r_7 = 10.0021$ | | | |
| | $d_7 = 2.8000$ | $n_5 = 1.84666$ | $\nu_5 = 23.78$ |
| $r_8 = -23.3617$ | | | |
| | $d_8 = D_2$ (variable) | | |
| $r_9 = \infty$ (stop) | | | |
| | $d_9 = D_3$ (variable) | | |
| $r_{10} = 23.3201$ | | | |
| | $d_{10} = 2.7000$ | $n_6 = 1.65844$ | $\nu_6 = 50.86$ |
| $r_{11} = -20.0228$ | | | |
| | $d_{11} = 0.1500$ | | |
| $r_{12} = 11.2746$ | | | |
| | $d_{12} = 2.9000$ | $n_7 = 1.58904$ | $\nu_7 = 53.20$ |
| $r_{13} = -167.1643$ | | | |
| | $d_{13} = 0.4600$ | | |

-continued

| | | | |
|---|---|---|---|
| $r_{14} = -21.8933$ | | | |
| | $d_{14} = 6.0000$ | $n_8 = 1.80518$ | $v_8 = 25.43$ |
| $r_{15} = 10.7636$ | | | |
| | $d_{15} = 0.2200$ | | |
| $r_{16} = 14.0734$ | | | |
| | $d_{16} = 2.8000$ | $n_9 = 1.58904$ | $v_9 = 53.20$ |
| $r_{17} = -15.8124$ | | | |
| | $d_{17} = D_4$ (variable) | | |
| $r_{18} = 83.1097$ | | | |
| | $d_{18} = 1.0000$ | $n_{10} = 1.80100$ | $v_{10} = 34.97$ |
| $r_{19} = 5.7463$ | | | |
| | $d_{19} = 0.3400$ | | |
| $r_{20} = 7.6305$ | | | |
| | $d_{20} = 2.8000$ | $n_{11} = 1.59270$ | $v_{11} = 35.29$ |
| $r_{21} = -22.3407$ | | | |
| | $d_{21} = 1.0000$ | | |
| $r_{22} = \infty$ | | | |
| | $d_{22} = 2.0000$ | $n_{12} = 1.51633$ | $v_{12} = 64.15$ |
| $r_{23} = \infty$ | | | |
| | $d_{23} = 1.0000$ | | |
| $r_{24} = \infty$ | | | |
| | $d_{24} = 0.6000$ | $n_{13} = 1.51633$ | $v_{13} = 64.15$ |
| $r_{25} = \infty$ | | | |
| f | 6.181 | 14.691 | 34.916 |
| $D_1$ | 1.100 | 12.039 | 18.359 |
| $D_2$ | 18.259 | 7.320 | 1.000 |
| $D_3$ | 8.307 | 5.967 | 1.509 |
| $D_4$ | 1.000 | 3.340 | 7.798 |

$HF_{III,IV} \cdot \sqrt{f_W \cdot f_T} = -0.0696$, $t_{II} \cdot \sqrt{f_W \cdot f_T} = 0.2818$ $t_I / \sqrt{f_W \cdot f_T} = 0.336$, $R_{26} / \sqrt{f_W \cdot f_T} = -1.590$ $R_{25} / (n_p - n_n) \sqrt{f_W \cdot f_T} = 5.525$ $v_{2n} - v_{2f} = 13.815$, $R_{35} R_{34} = 0.1310$ $D_{35} \sqrt{f_W \cdot f_T} = 0.4084$, $v_{3f} - v_{3n} = 26.99$ $v_{4f} - v_{4n} = 0.32$, $\sqrt{f_W \cdot f_T} / f_{II} = 0.2914$ $v_{1f} - v_{1n} = 30.9$, $\phi_{1n} \sqrt{f_W \cdot f_T} = 0.2083$

Embodiment 11

| | | |
|---|---|---|
| f = 6 mm~36 mm, 2ω = 50.2°~9.4° | | F/2.0~3.5 |
| $r_1 = 25.2617$ | | |
| | $d_1 = 1.2000$ | $n_1 = 1.84666$  $v_1 = 23.78$ |
| $r_2 = 18.0644$ | | |
| | $d_2 = 0.0600$ | |
| $r_3 = 18.3653$ | | |
| | $d_3 = 3.9000$ | $n_2 = 1.72916$  $v_2 = 54.68$ |
| $r_4 = 173.3607$ | | |
| | $d_4 = D_1$ (variable) | |
| $r_5 = 77.0905$ | | |
| | $d_5 = 0.9000$ | $n_3 = 1.83400$  $v_3 = 37.16$ |
| $r_6 = 8.3774$ | | |
| | $d_6 = 2.7200$ | |
| $r_7 = -11.5608$ | | |
| | $d_7 = 0.8000$ | $n_4 = 1.66446$  $v_4 = 35.81$ |
| $r_8 = 11.5608$ | | |
| | $d_8 = 3.2000$ | $n_5 = 1.84666$  $v_5 = 23.78$ |
| $r_9 = -22.8295$ | | |
| | $d_9 = D_2$ (variable) | |
| $r_{10} = \infty$ (stop) | | |
| | $d_{10} = D_3$ (variable) | |
| $r_{11} = 16.4545$ | | |
| | $d_{11} = 2.7000$ | $n_6 = 1.69680$  $v_6 = 55.52$ |
| $r_{12} = -35.2236$ | | |
| | $d_{12} = 0.1500$ | |

-continued

| | | | |
|---|---|---|---|
| $r_{13} = 16.4424$ | | | |
| | $d_{13} = 2.8000$ | $n_7 = 1.60311$ | $v_7 = 60.70$ |
| $r_{14} = -28.3114$ | | | |
| | $d_{14} = 0.1900$ | | |
| $r_{15} = -19.8134$ | | | |
| | $d_{15} = 6.0000$ | $n_8 = 1.80518$ | $v_8 = 25.43$ |
| $r_{16} = 18.9085$ | | | |
| | $d_{16} = D_4$ (variable) | | |
| $r_{17} = 10.4530$ | | | |
| | $d_{17} = 1.0000$ | $n_9 = 1.80518$ | $v_9 = 25.43$ |
| $r_{18} = 6.6401$ | | | |
| | $d_{18} = 0.5500$ | | |
| $r_{19} = 10.2529$ | | | |
| | $d_{19} = 2.4000$ | $n_{10} = 1.74950$ | $v_{10} = 35.27$ |
| $r_{20} = -80.9966$ | | | |
| | $d_{20} = 2.0000$ | | |
| $r_{21} = \infty$ | | | |
| | $d_{21} = 3.5000$ | $n_{11} = 1.54771$ | $v_{11} = 62.83$ |
| $r_{22} = \infty$ | | | |
| | $d_{22} = 1.0000$ | | |
| $r_{23} = \infty$ | | | |
| | $d_{23} = 0.6000$ | $n_{12} = 1.51633$ | $v_{12} = 64.15$ |
| $r_{24} = \infty$ | | | |
| f | 6.180 | 14.690 | 34.919 |
| $D_1$ | 1.000 | 11.157 | 17.728 |
| $D_2$ | 17.728 | 7.571 | 1.000 |
| $D_3$ | 11.577 | 7.595 | 1.522 |
| $D_4$ | 1.000 | 4.982 | 11.055 |

$HF_{III,IV} \sqrt{f_W \cdot f_T} = 0.8673$, $t_{II} / \sqrt{f_W \cdot f_T} = 0.2689$ $t_I / \sqrt{f_W \cdot f_T} = 0.3513$, $R_{26} / \sqrt{f_W \cdot f_T} = -1.554$ $R_{25} / (n_p - n_n) \sqrt{f_W \cdot f_T} = 4.319$ $v_{2n} - v_{2f} = 12.705$, $D_{35} / \sqrt{f_W \cdot f_T} = 0.4084$ $v_{3f} - v_{3n} = 32.68$
$(R_{31} - R_{32})/(R_{31} - R_{32}) = -0.3632$ $v_{4f} - v_{4n} = 9.84$, $\sqrt{f_W \cdot f_T} / f_{II} = 0.6044$ $v_{1f} - v_{1n} = 30.9$, $\phi_{1n} \sqrt{f_W \cdot f_T} = 0.1812$

Embodiment 12

| | | |
|---|---|---|
| f = 6 mm~36 mm, 2ω = 50.2°~9.4° | | F/2.0~3.5 |
| $r_1 = 24.5467$ | | |
| | $d_1 = 1.2000$ | $n_1 = 1.84666$  $v_1 = 23.78$ |
| $r_2 = 19.5142$ | | |
| | $d_2 = 0.1200$ | |
| $r_3 = 20.3207$ | | |
| | $d_3 = 3.5000$ | $n_2 = 1.72916$  $v_2 = 54.68$ |
| $r_4 = 122.6814$ | | |
| | $d_4 = D_1$ (variable) | |
| $r_5 = 83.5379$ | | |
| | $d_5 = 0.9000$ | $n_3 = 1.84666$  $v_3 = 23.78$ |
| $r_6 = 7.6564$ | | |
| | $d_6 = 2.8600$ | |
| $r_7 = -13.2999$ | | |
| | $d_7 = 0.8000$ | $n_4 = 1.58144$  $v_4 = 40.75$ |
| $r_8 = 10.2960$ | | |
| | $d_8 = 3.3000$ | $n_5 = 1.84666$  $v_5 = 23.78$ |
| $r_9 = -28.6984$ | | |
| | $d_9 = D_2$ (variable) | |
| $r_{10} = \infty$ (stop) | | |
| | $d_{10} = D_3$ (variable) | |
| $r_{11} = 20.0754$ | | |

-continued

| | | | |
|---|---|---|---|
| | $d_{11} = 2.3000$ | $n_6 = 1.65844$ | $\nu_6 = 50.86$ |
| $r_{12} = -75.9867$ | | | |
| | $d_{12} = 0.1500$ | | |
| $r_{13} = 21.5360$ | | | |
| | $d_{13} = 2.0000$ | $n_7 = 1.65844$ | $\nu_7 = 50.86$ |
| $r_{14} = 822.9372$ | | | |
| | $d_{14} = 0.1500$ | | |
| $r_{15} = 20.7525$ | | | |
| | $d_{15} = 2.8000$ | $n_8 = 1.65844$ | $\nu_8 = 50.86$ |
| $r_{16} = -21.7699$ | | | |
| | $d_{16} = 0.0900$ | | |
| $r_{17} = -19.0113$ | | | |
| | $d_{17} = 5.0000$ | $n_9 = 1.80518$ | $\nu_9 = 25.43$ |
| $r_{18} = 11.4051$ | | | |
| | $d_{18} = D_4$ (variable) | | |
| $r_{19} = 9.4236$ | | | |
| | $d_{19} = 1.000$ | $n_{10} = 1.80518$ | $\nu_{10} = 25.43$ |
| $r_{20} = 6.7197$ | | | |
| | $d_{20} = 0.4300$ | | |
| $r_{21} = 9.2259$ | | | |
| | $d_{21} = 2.5000$ | $n_{11} = 1.73520$ | $\nu_{11} = 41.08$ |
| $r_{22} = -1096.7302$ | | | |
| | $d_{22} = 1.5000$ | | |
| $r_{23} = \infty$ | | | |
| | $d_{23} = 3.5000$ | $n_{12} = 1.54771$ | $\nu_{12} = 62.83$ |
| $r_{24} = \infty$ | | | |
| | $d_{24} = 1.0000$ | | |
| $r_{25} = \infty$ | | | |
| | $d_{25} = 0.6000$ | $n_{13} = 1.51633$ | $\nu_{13} = 64.15$ |
| $r_{26} = \infty$ | | | |
| f | 6.180 | 14.690 | 34.919 |
| $D_1$ | 1.000 | 11.700 | 18.420 |
| $D_2$ | 18.420 | 7.720 | 1.000 |
| $D_3$ | 12.680 | 8.377 | 1.609 |
| $D_4$ | 1.000 | 5.303 | 12.072 |

$BF_{III, W} \cdot \sqrt{f_W \cdot f_T} = 1.2112, \ 1/r \cdot \sqrt{f_W \cdot f_T} = 0.2675$ $1/\sqrt{f_W \cdot f_T} = 0.3281, \ R_{26} \cdot \sqrt{f_W \cdot f_T} = -1.954$ $R_{26}/(n_f - n_a) \sqrt{f_W \cdot f_T} = 2.643$ $\nu_{2r} - \nu_{2f} = 8.485, \ D_{35} \cdot \sqrt{f_W \cdot f_T} = 0.3404$ $\nu_{3f} - \nu_{3r} = 25.43$
$(R_{31} - R_{32})/(R_{31} - R_{32}) = -0.5820$ $\nu_{4f} - \nu_{4r} = 15.65, \ \sqrt{f_W \cdot f_T} / f_{/1} = 0.7168$ $\nu_{1f} - \nu_{1n} = 30.9, \ \phi_{1n} \sqrt{f_W \cdot f_T} = 0.1164$ wherein the reference symbols $r_1, r_2, \ldots$ represent the radii of curvature on the surfaces of the respective lens elements, the reference symbols $d_1, d_2 \ldots$ designate the thickness of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

Figure 13:
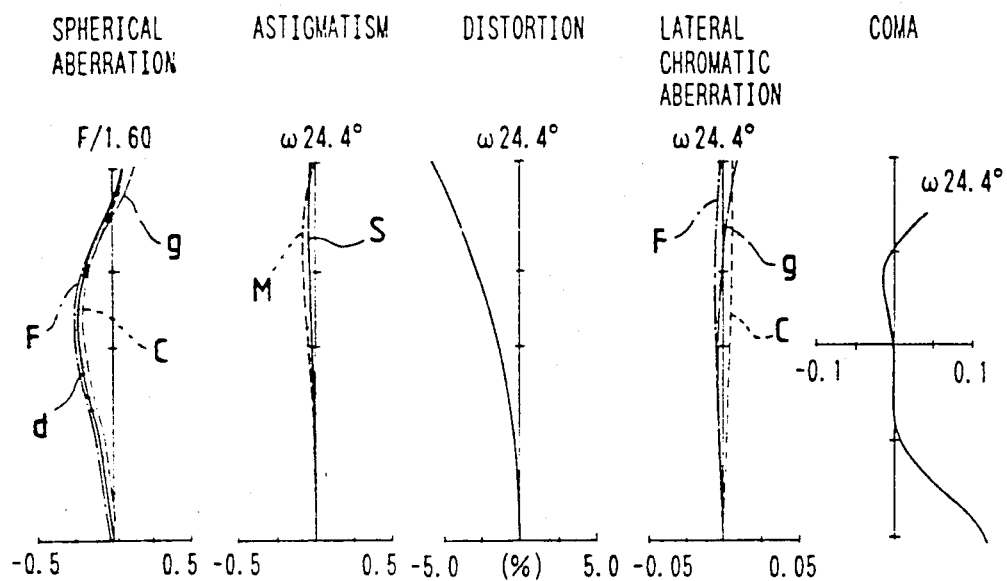
FIG. 13 through FIG. 15 show graphs illustrating aberration characteristics of the Embodiment 1 of the present invention.
Figure 14:
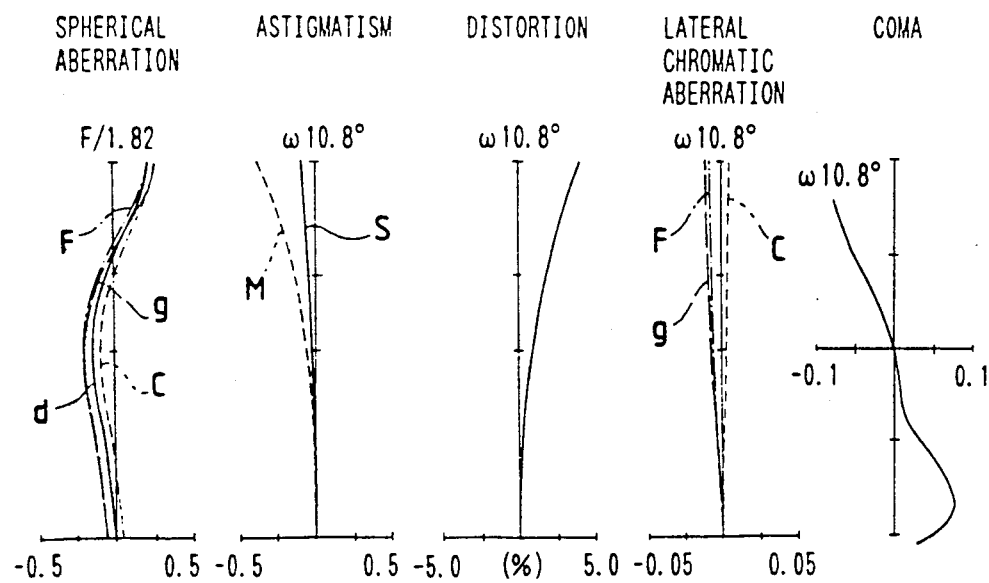
Figure 15:
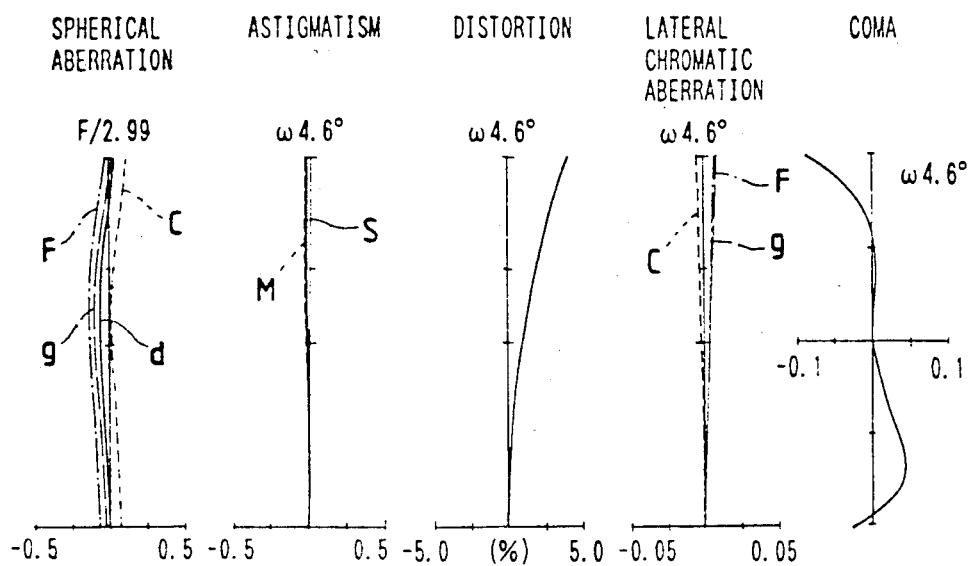

The Embodiment 1 has the composition illustrated in FIG. 1, wherein the first lens unit consists of a negative lens element and a positive lens element, the second lens unit consists of a negative lens element, a negative lens element and a positive lens element, the third lens unit consists of a positive lens element, a negative lens element and a positive lens element, and the fourth lens unit consists of a positive lens element and a negative lens element. Aberration characteristics at the wide position, intermediate focal length and tele position of the Embodiment 1 are illustrated in FIG. 13, FIG. 14 and FIG. 15 respectively.

Figure 2:
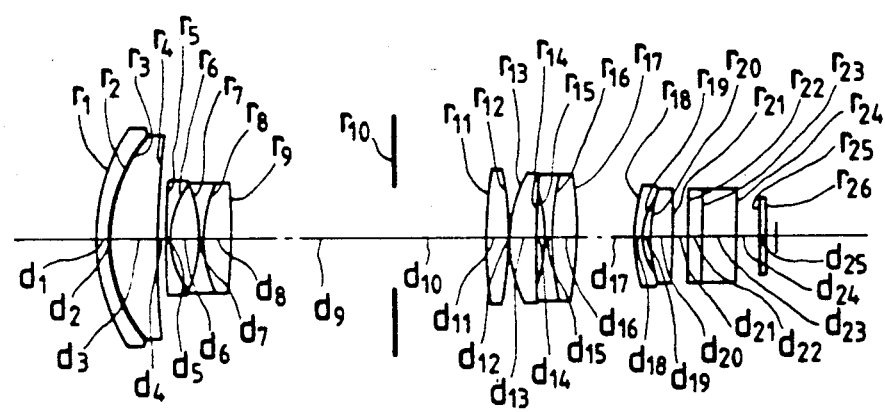
Figure 3:
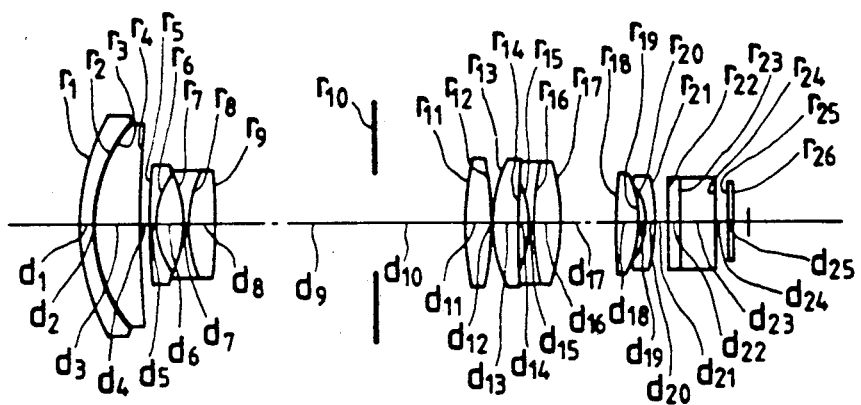

The Embodiments 2 and 3 have the compositions illustrated in FIG. 2 and FIG. 3 respectively, in each of which the third lens unit consists of a positive lens element, a positive lens element, a negative lens element and a positive lens element.

Figure 16:
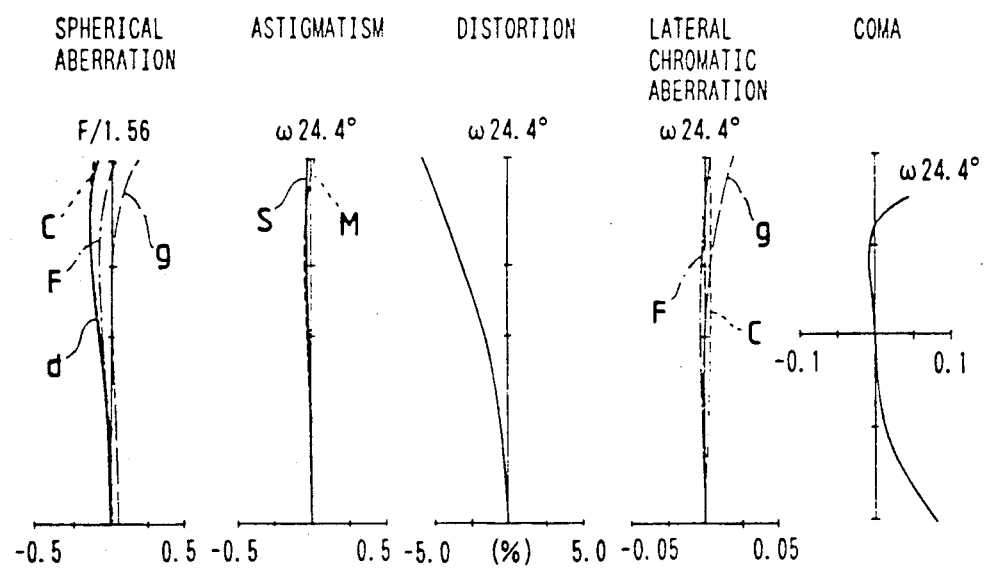
FIG. 16 through FIG. 18 show graphs illustrating aberration characteristics of the Embodiment 2 of the present invention.
Figure 17:
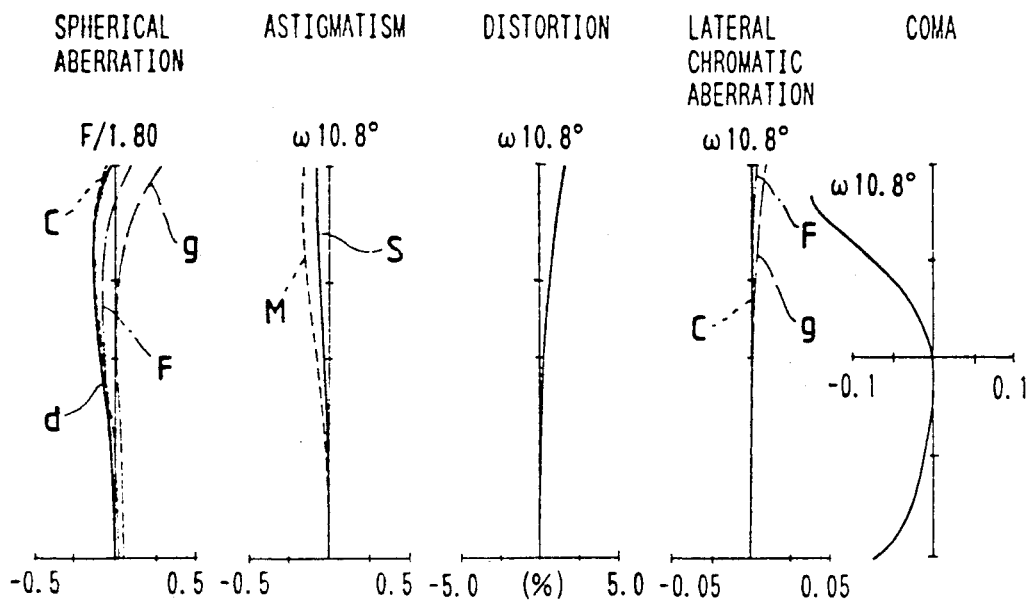
Figure 18:
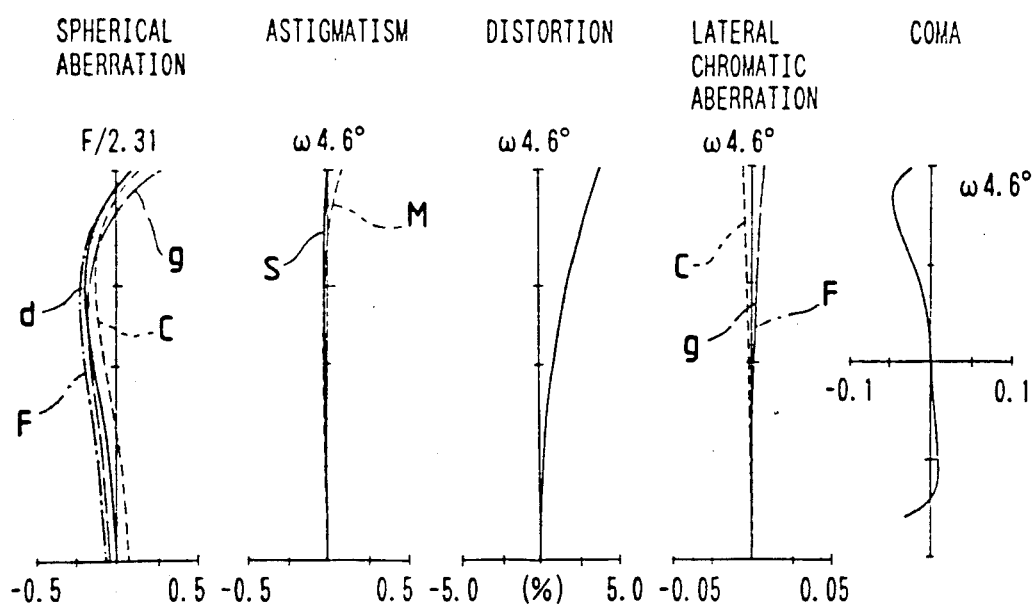
Figure 19:
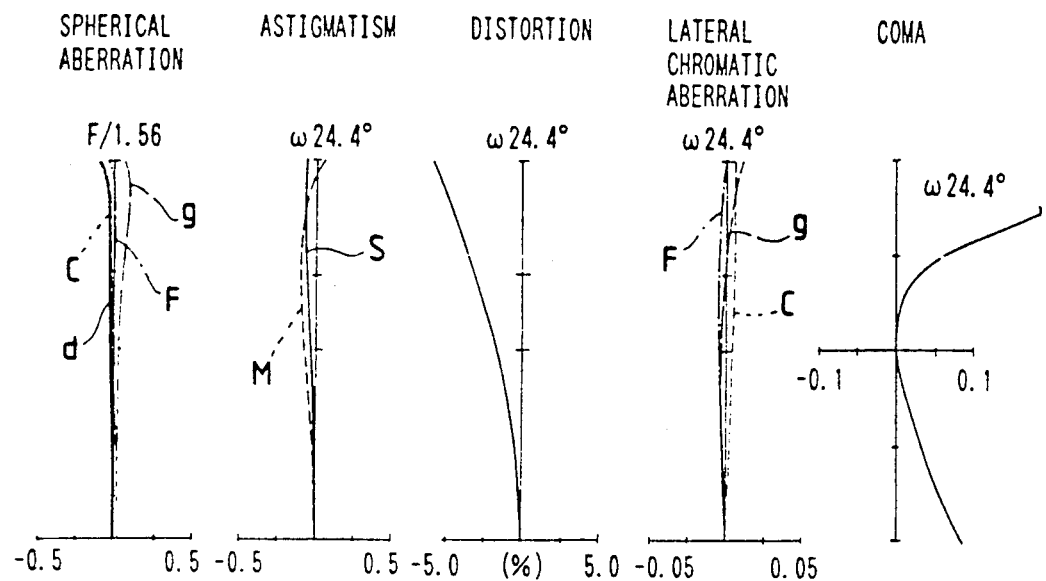
FIG. 19 through FIG. 21 show curves visualizing aberration characteristics of the Embodiment 3 of the present invention.
Figure 20:
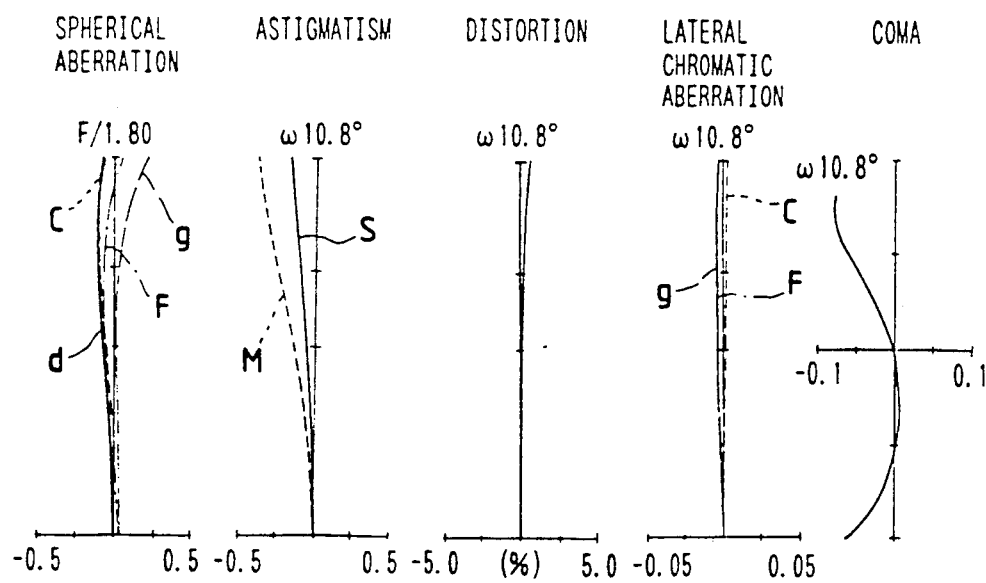
Figure 21:
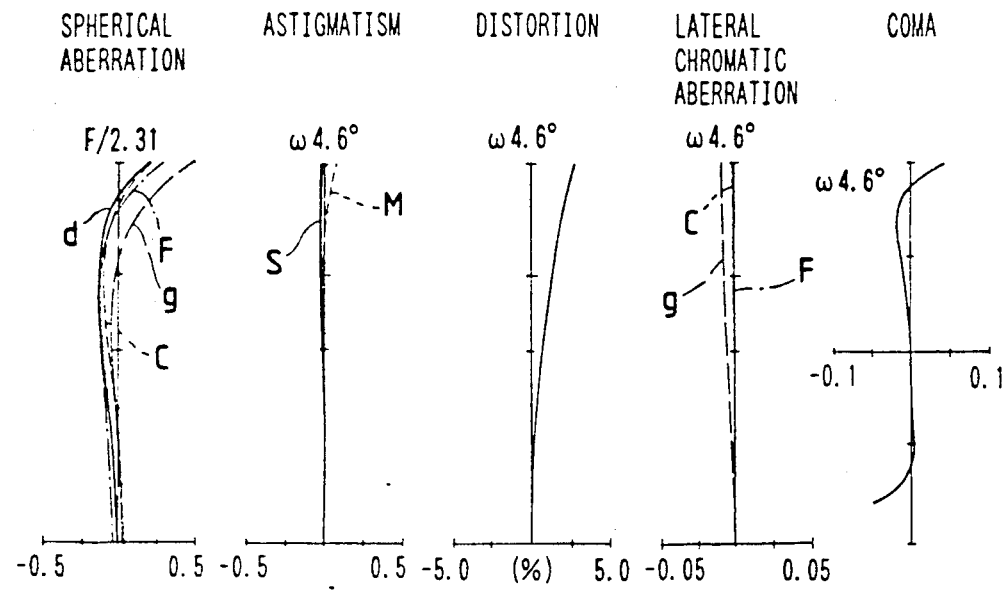

Aberration characteristics at the wide position, intermediate focal length and tele position of the Embodiment 2 are illustrated in FIG. 16, FIG. 17 and FIG. 18 respectively, whereas aberration characteristics at the wide position, intermediate focal length and tele position of the Embodiment 3 are visualized in FIG. 19, FIG. 20 and FIG. 21 respectively.

Figure 4:
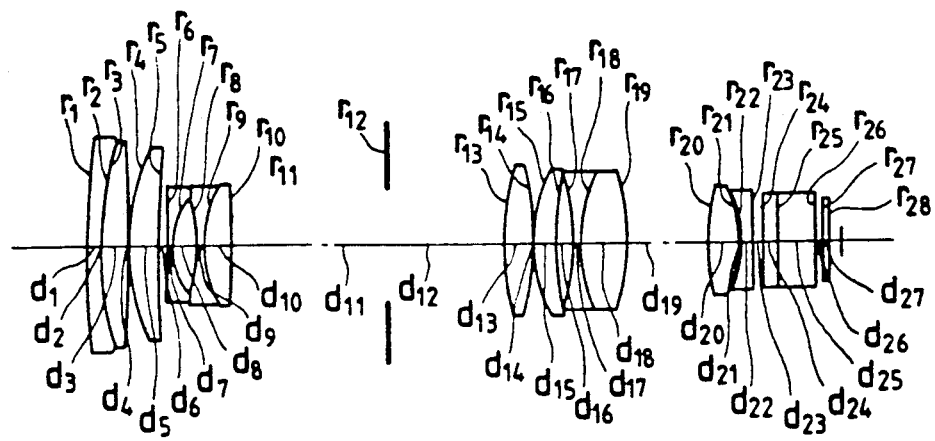

The Embodiment 4 has the composition illustrated in FIG. 4, wherein the first lens unit consists of a negative lens element, a positive lens element and a positive lens element. The other lens units have the compositions similar to those used in the Embodiment 2 or 3.

Figure 22:
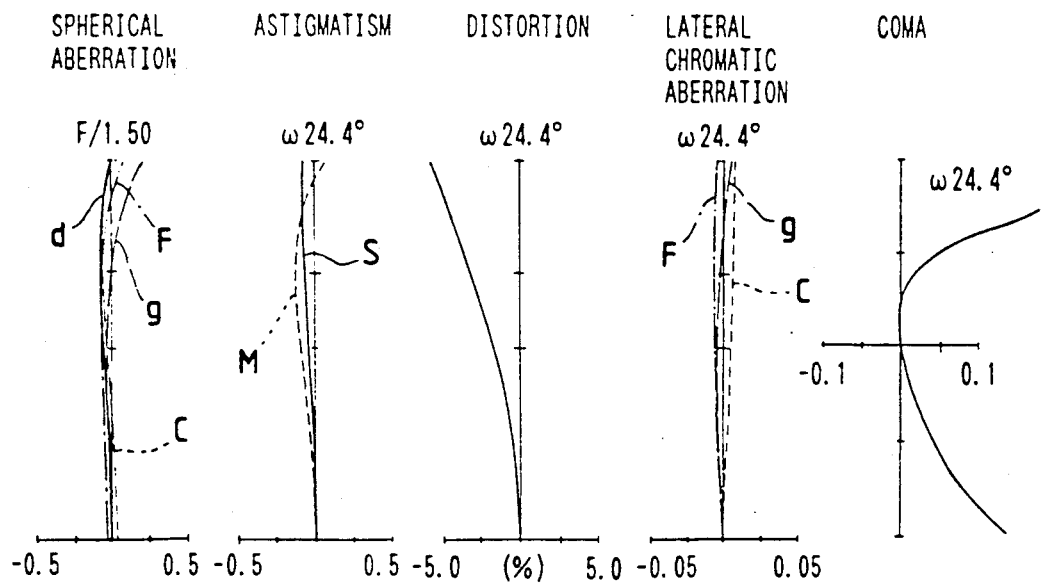
FIG. 22 through FIG. 24 show curves visualizing aberration characteristics of the Embodiment 4 of the present invention.
Figure 23:
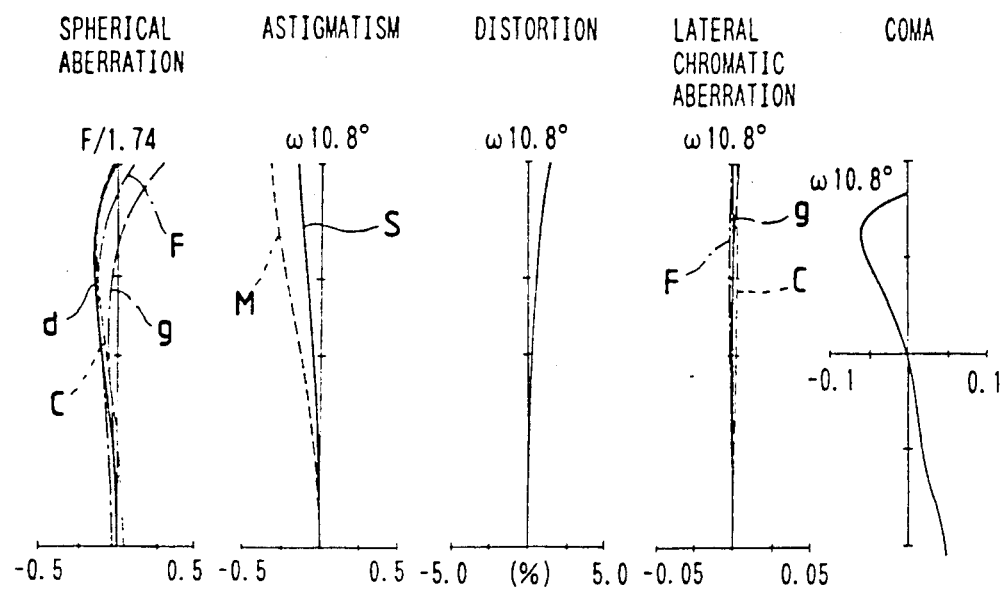
Figure 24:
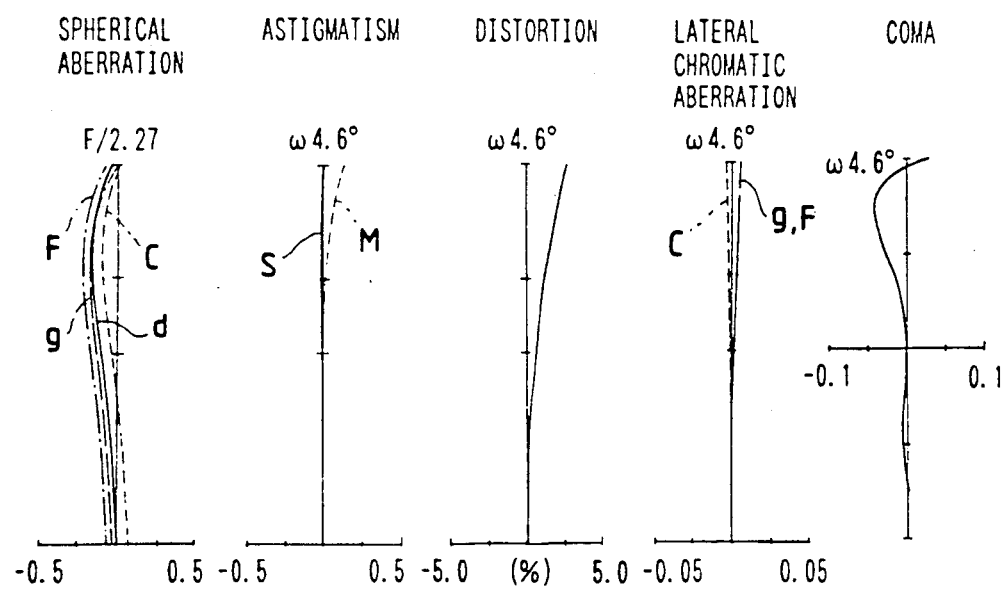

Aberration characteristics at the wide position, intermediate focal length and tele position of the Embodiment 4 are shown in FIG. 22, FIG. 23 and FIG. 24 respectively.

Figure 5:
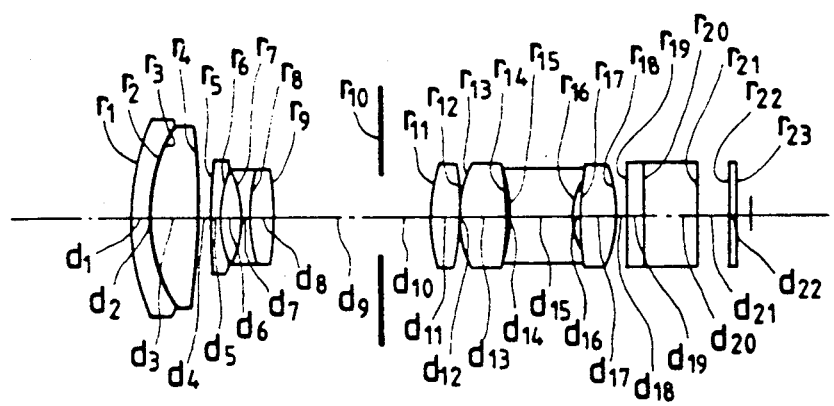
Figure 6:
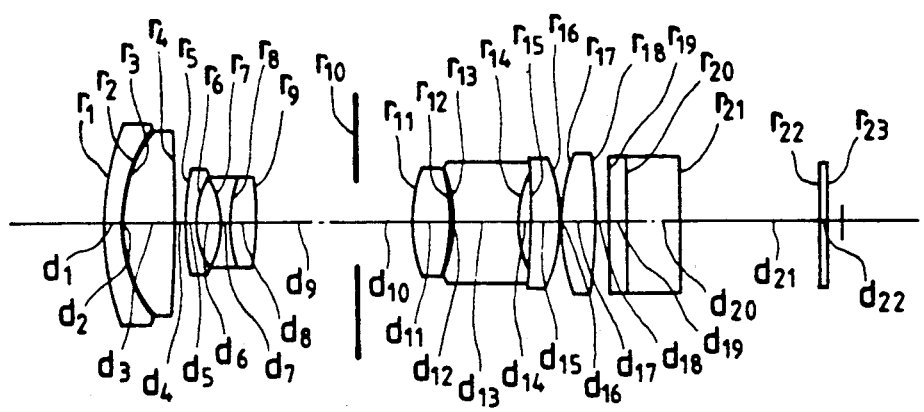

The Embodiments 5 and 6 have the compositions shown in FIG. 5 and FIG. 6 respectively, in each of which the zoom lens system according to the present invention consists of three lens units.

Figure 25:
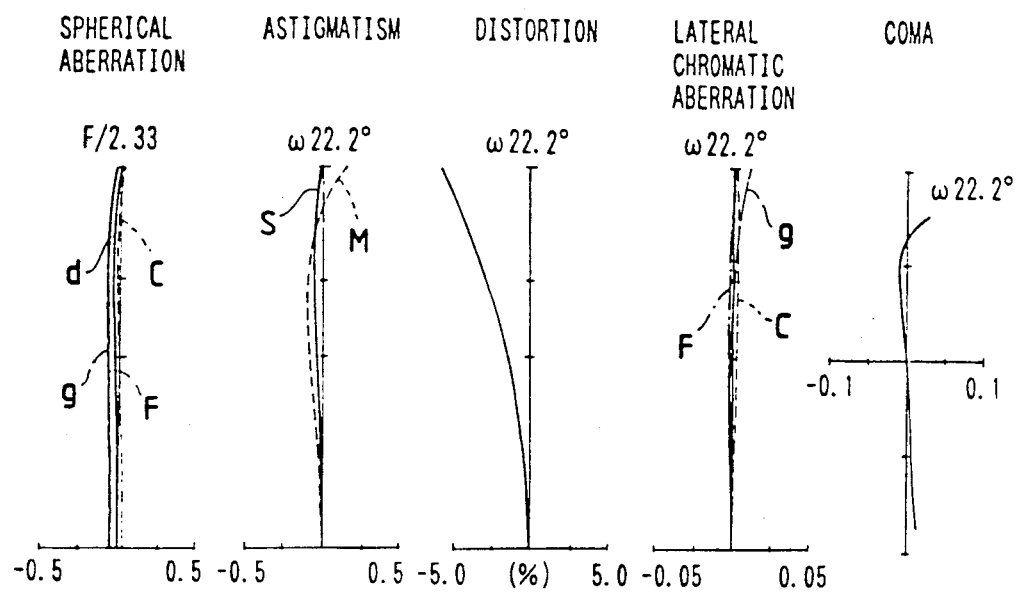
FIG. 25 through FIG. 27 show graphs visualizing aberration characteristics of the Embodiment 5 of the present invention.
Figure 26:
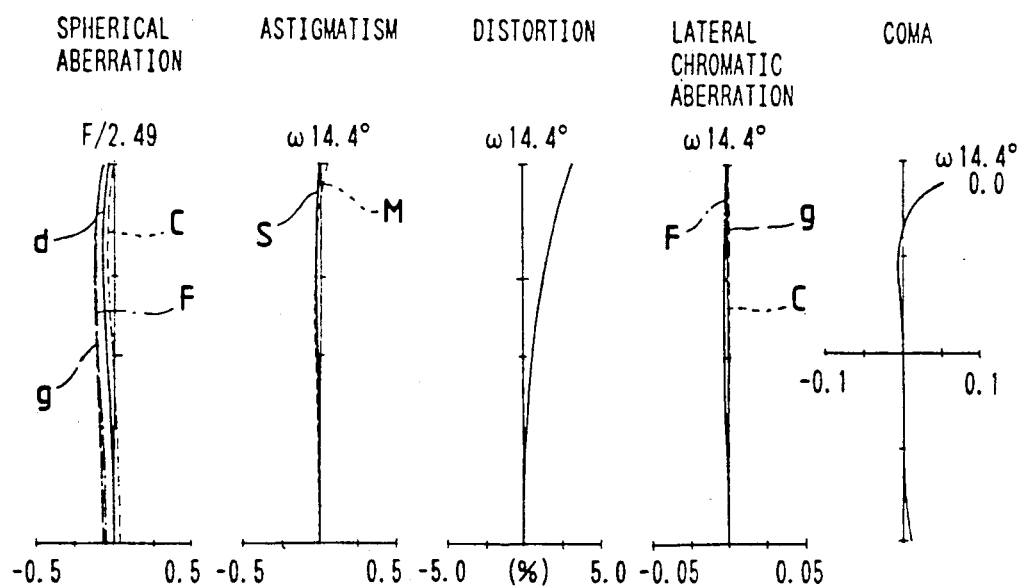
Figure 27:
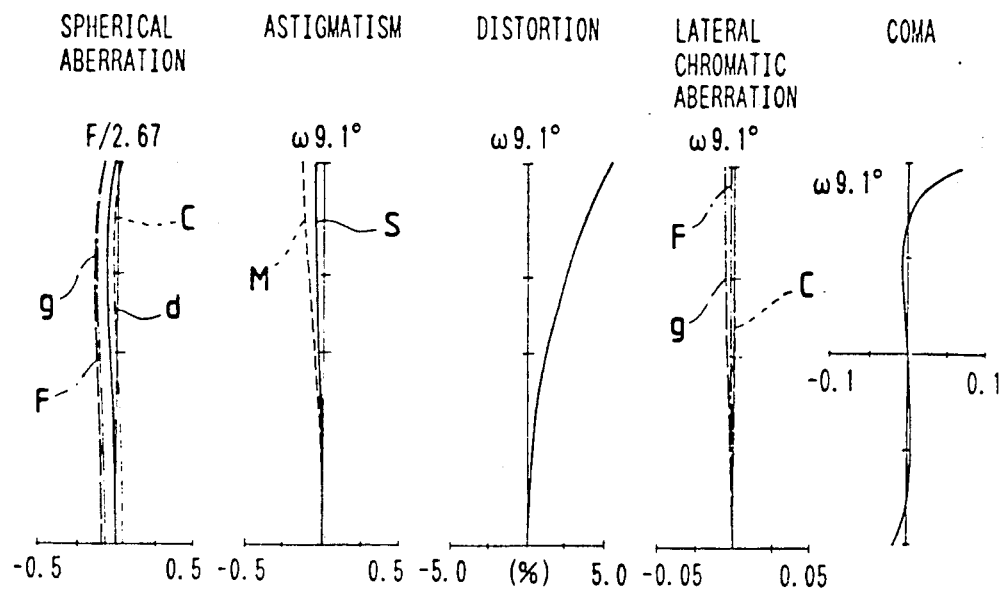
Figure 28:
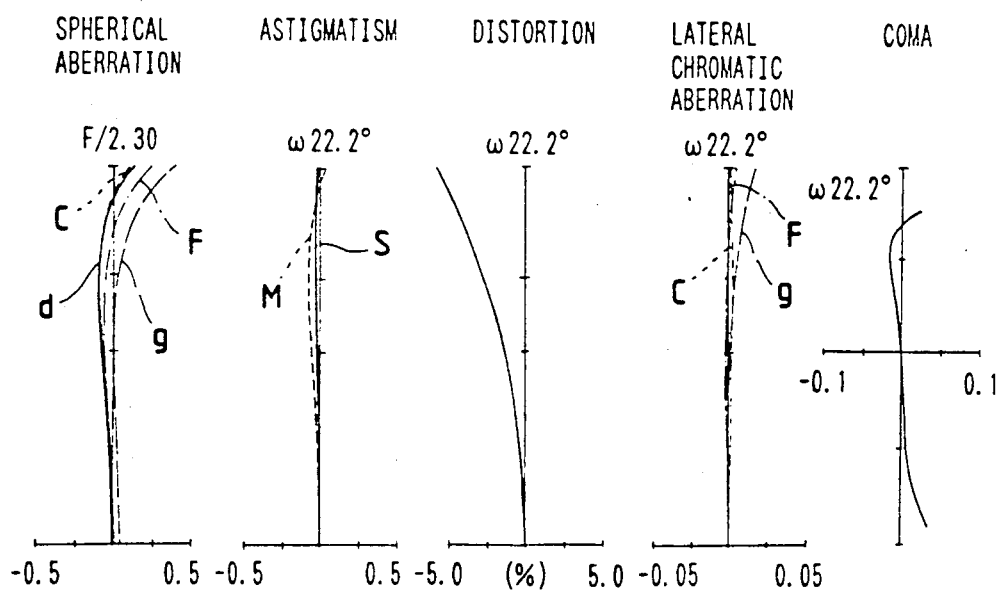
FIG. 28 through FIG. 30 show graphs illustrating aberration characteristics of the Embodiment 6 of the present invention.
Figure 29:
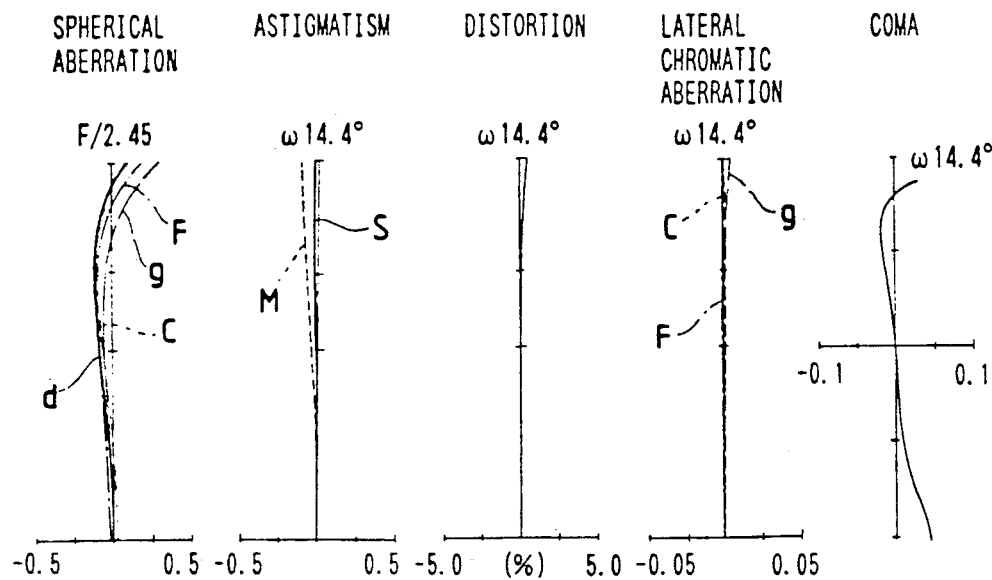
Figure 30:
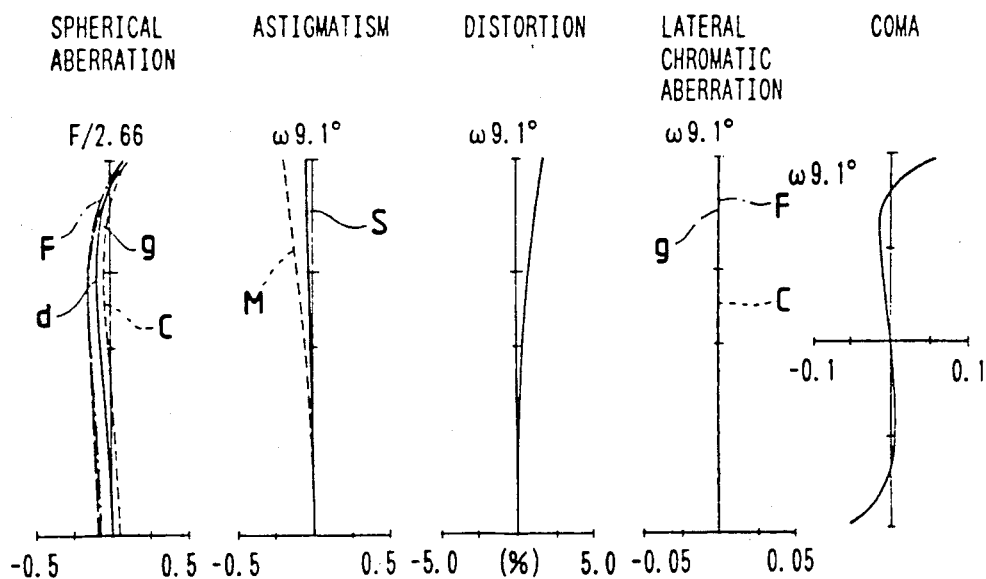

Aberration characteristics at the wide position, intermediate focal length and tele position of the Embodiment 5 are illustrated in FIG. 25, FIG. 26 and FIG. 27 respectively, whereas aberration characteristics at the wide position, intermediate focal length and tele position of the Embodiment 6 are visualized in FIG. 28, FIG. 29 and FIG. 30 respectively.

Figure 7:
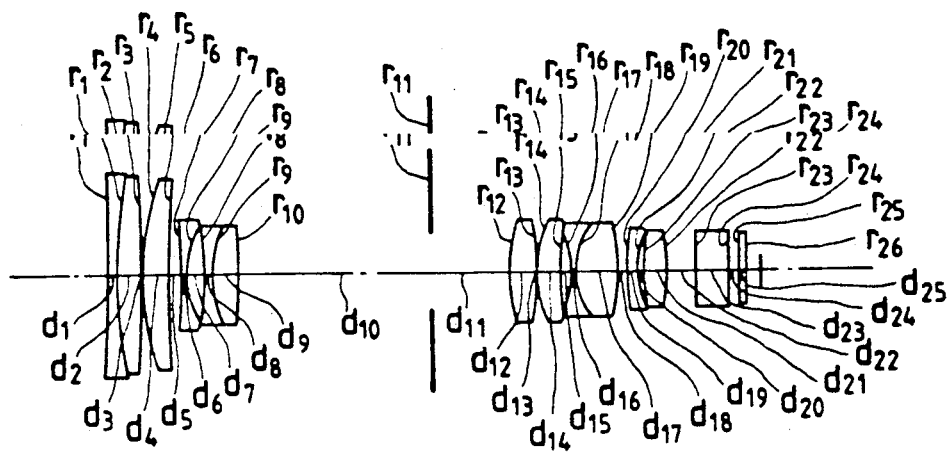

The Embodiment 7 has the composition shown in FIG. 7, wherein the first lens unit consists of a negative lens element, a positive lens element and a positive lens element, the second lens unit consists of a negative lens element, a negative lens element and a positive lens element, the third lens unit consists of a positive lens element, a positive lens element, a negative lens element and a positive lens element, and the fourth lens unit consists of a negative meniscus lens element having a convex surface on the object side and a positive lens element.

Figure 31:
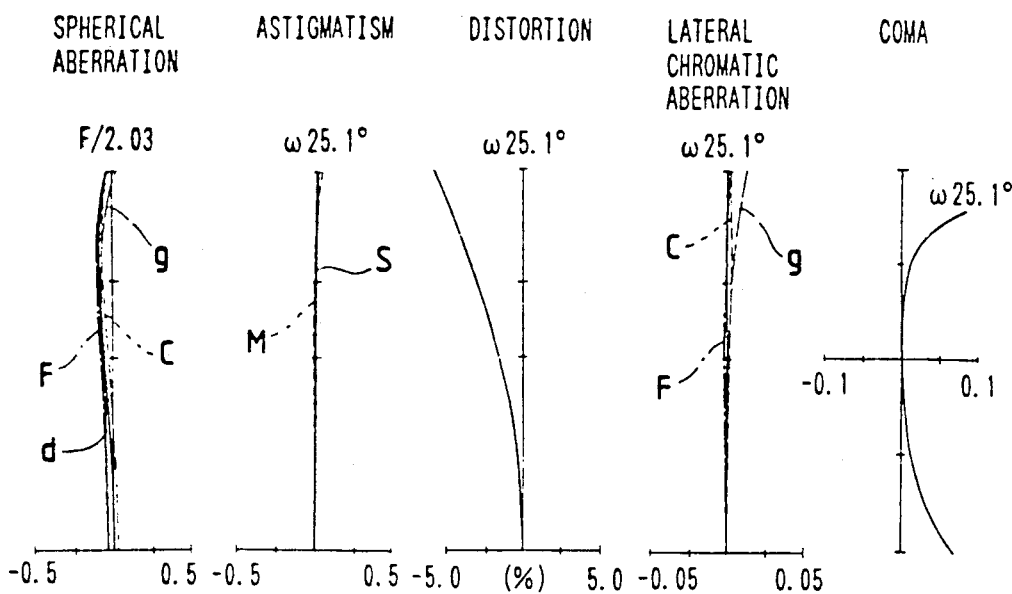
FIG. 31 through FIG. 33 show curves illustrating aberration characteristics of the Embodiment 7 of the present invention.
Figure 32:
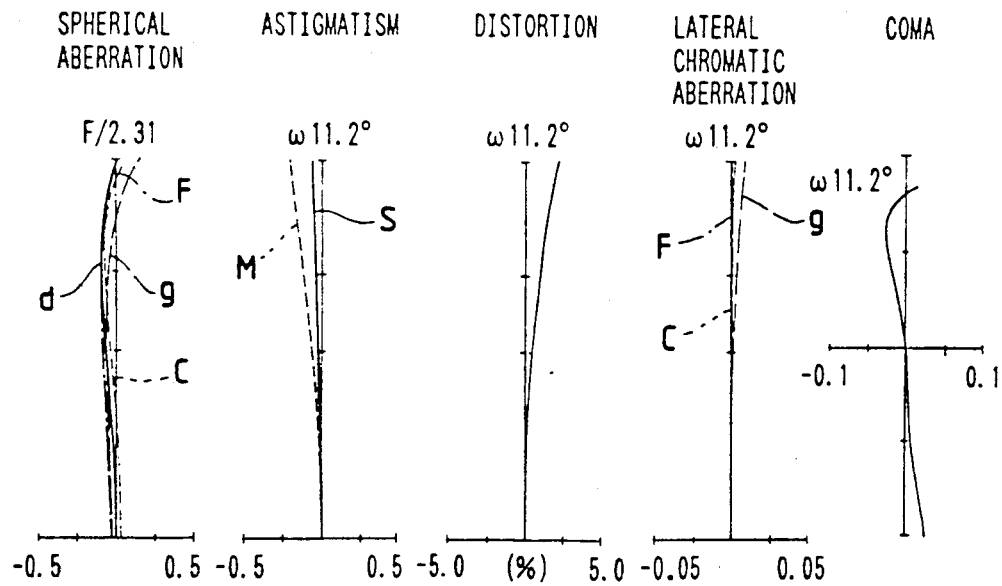
Figure 33:
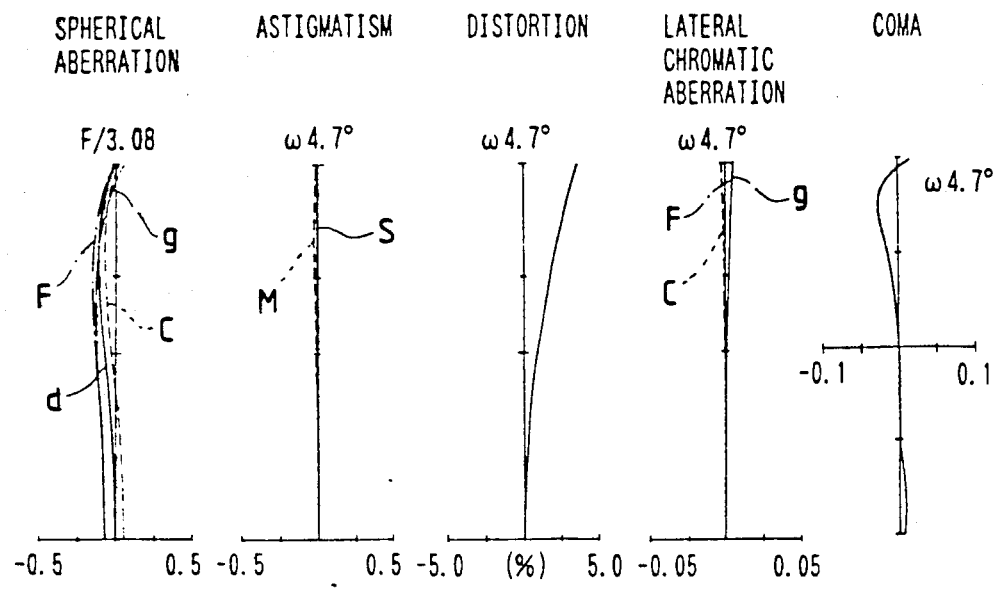

Aberration characteristics at the wide position, intermediate focal length and tele position of the Embodiment 7 are visualized in FIG. 31, FIG. 32 and FIG. 33 respectively.

Figure 8:
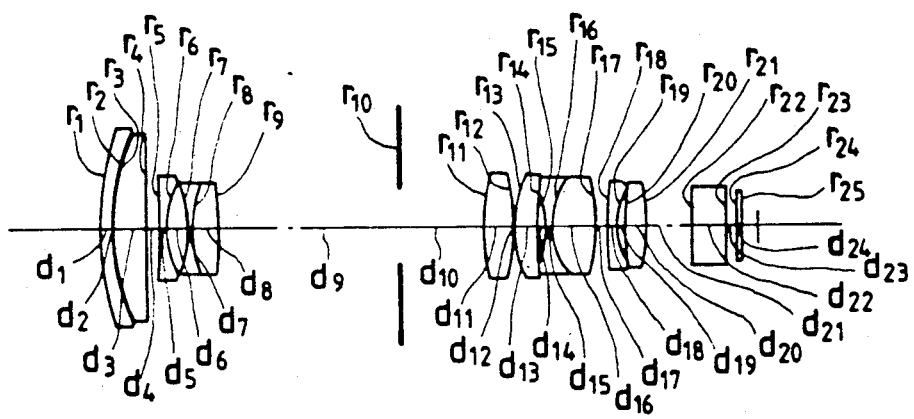
Figure 9:
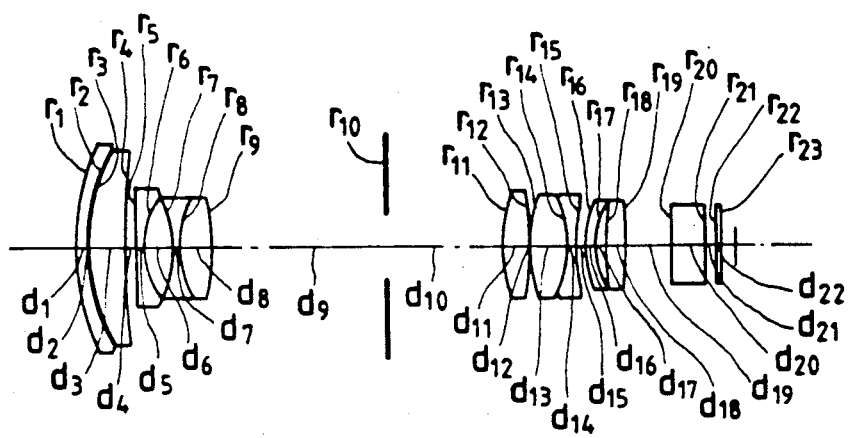
Figure 10:
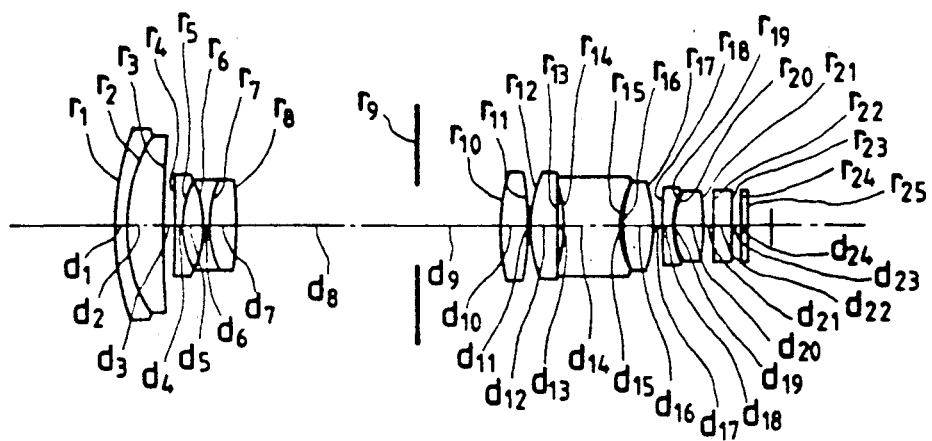

The Embodiments 8, 9 and 10 have the compositions illustrated in FIG. 8, FIG. 9 and FIG. 10 respectively, in each of which the first lens unit consists of a negative lens element and a positive lens element, the second lens unit consists of a negative lens element, a negative lens element and a positive lens element, the third lens unit consists of a positive lens element, a positive lens element, a negative lens element and a positive lens element, and the fourth lens unit consists of a negative meniscus lens element having a convex surface on the object side and a positive lens element.

Figure 34:
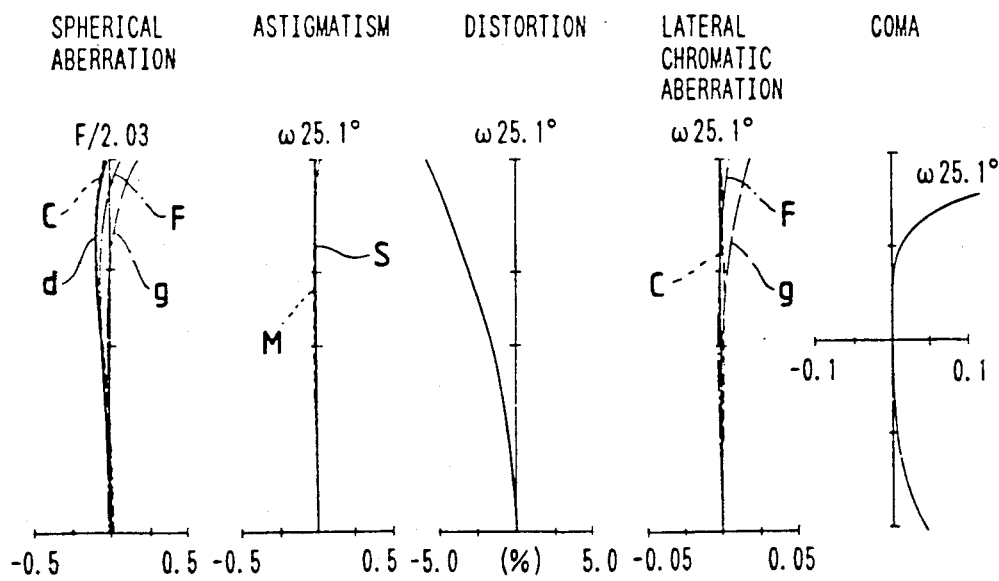
Figure 37:
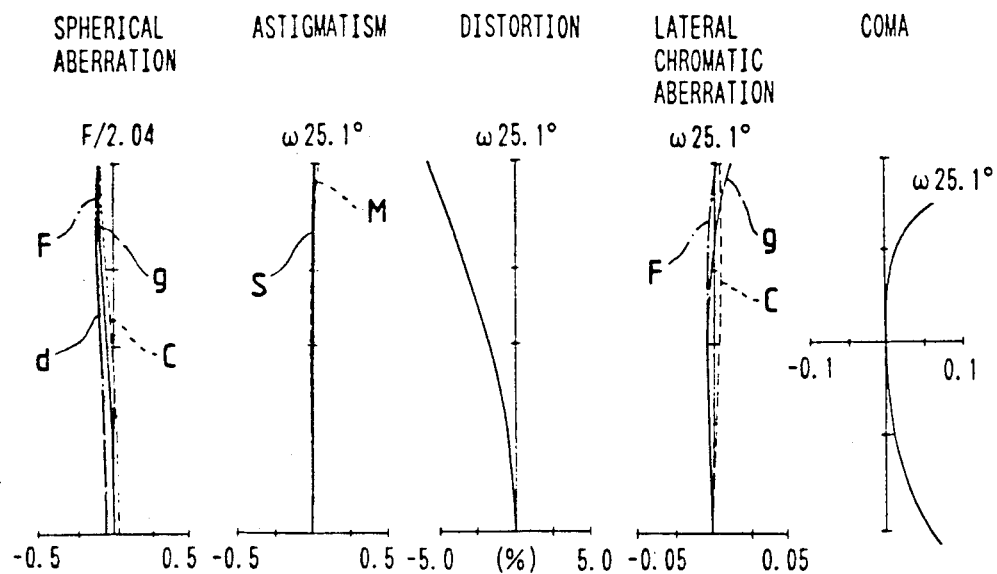
FIG. 37 through FIG. 39 show graphs illustrating aberration characteristics of the Embodiment 9 of the present invention.
Figure 38:
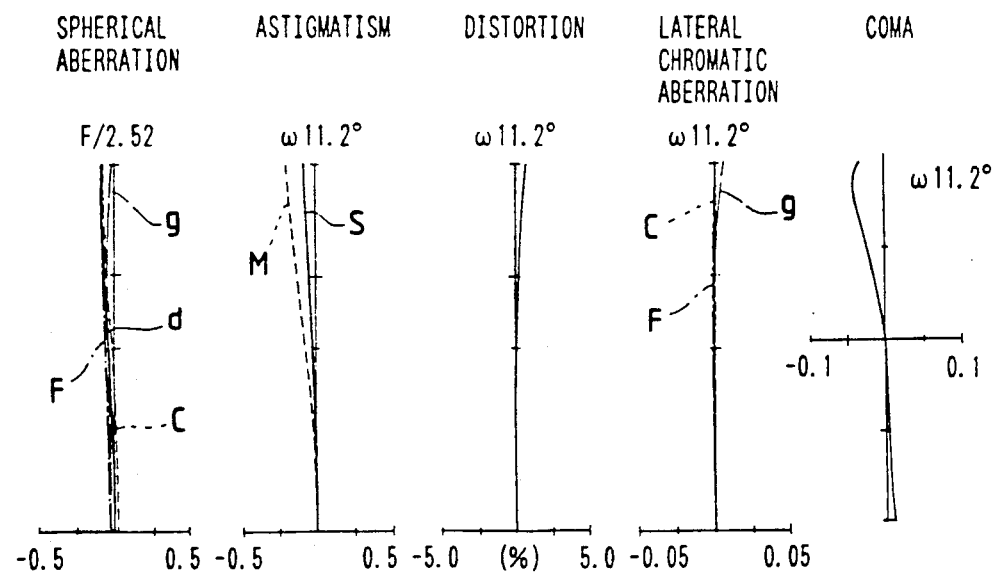
Figure 39:
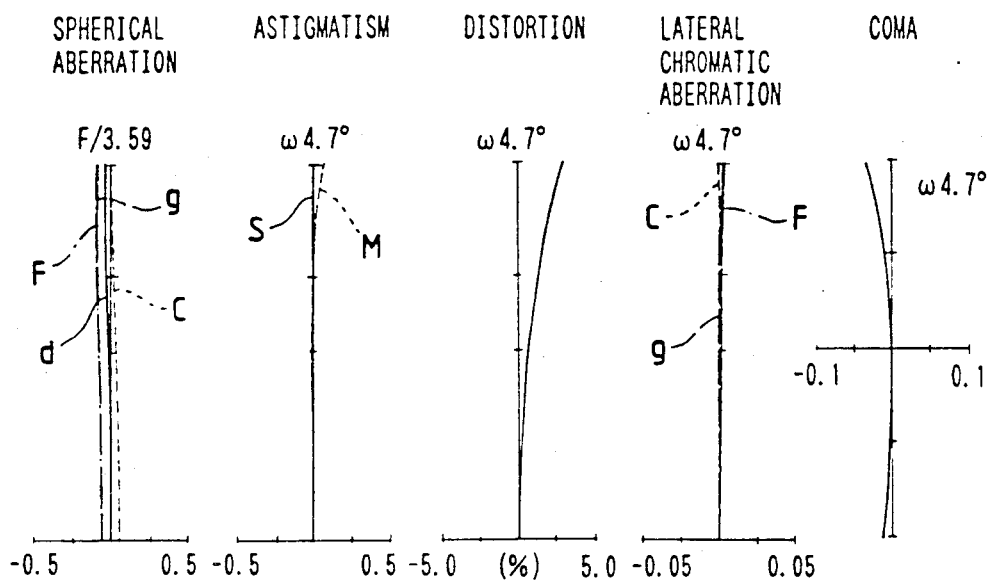
Figure 40:
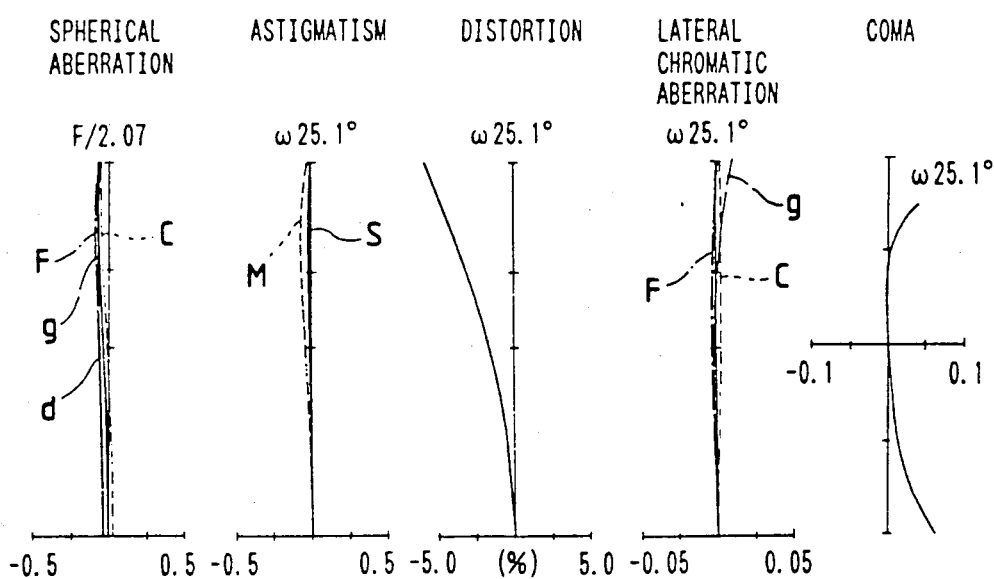
FIG. 40 through FIG. 42 show curves visualizing aberration characteristics of the Embodiment 10 of the present invention.
Figure 41:
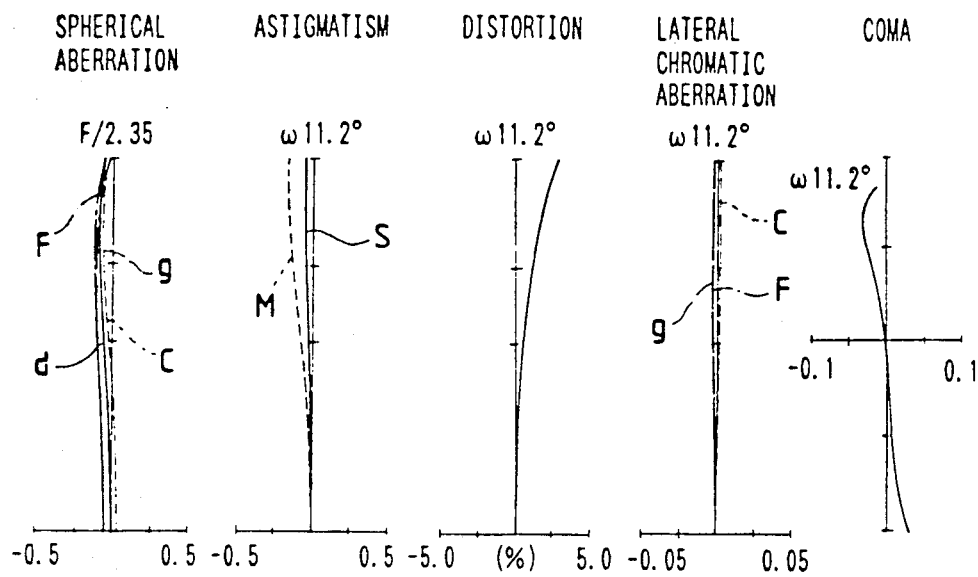
Figure 42:
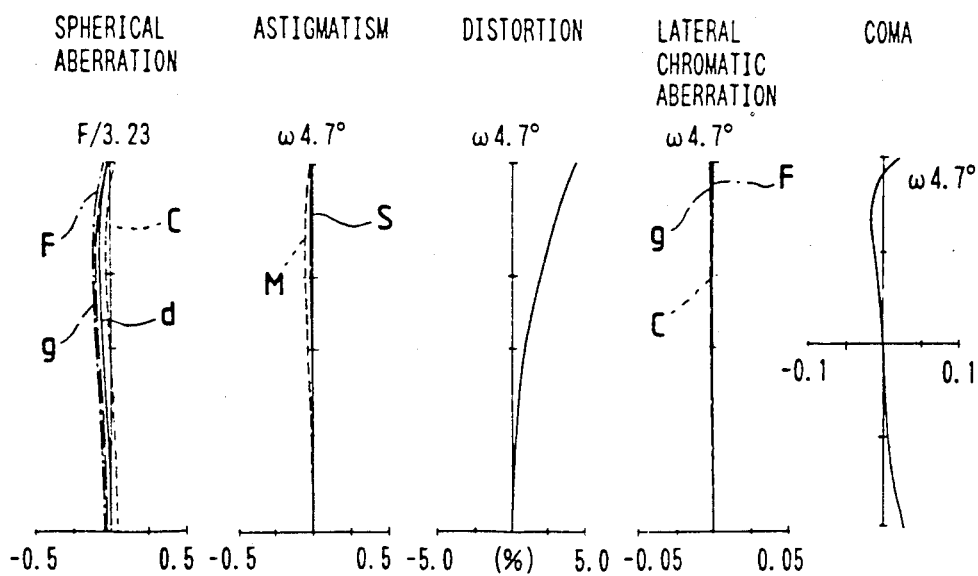

Aberration characteristics at the wide position, intermediate focal length and tele position of the Embodiment 8 are illustrated in FIG. 34, FIG. 35 and FIG. 36 respectively, aberration characteristics at the wide position, intermediate focal length and tele position of the Embodiment 9 are shown in FIG. 37, FIG. 38 and FIG. 39 respectively, and aberration characteristics at the wide position, intermediate focal length and tele position of the Embodiment 10 are visualized in FIG. 40, FIG. 41 and FIG. 42 respectively.

Figure 11:
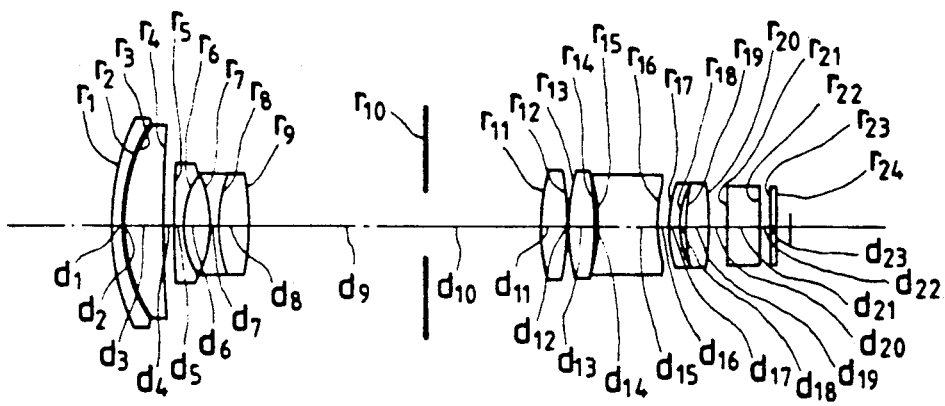

The Embodiment 11 has the composition presented in FIG. 11, wherein the first lens unit consists of a negative lens element and a positive lens element, the second lens unit consists of a negative lens element, a negative lens element and a positive lens element, the third lens unit consists of a positive lens element, a positive lens element and a negative lens element, and the fourth lens unit consists of a negative meniscus lens element having a convex surface on the object side and a positive lens element.

Figure 43:
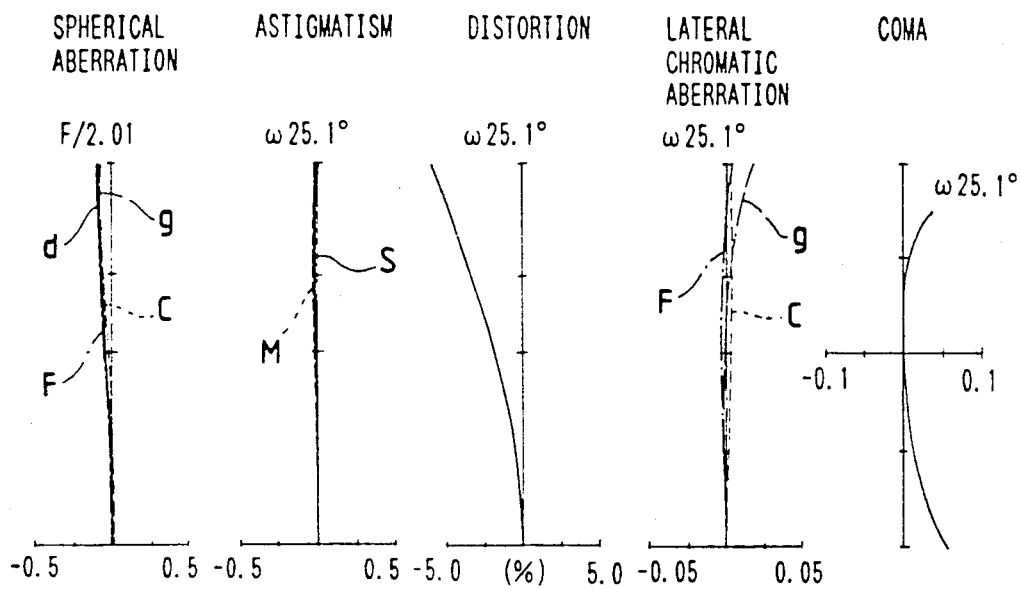
FIG. 43 through FIG. 45 show graphs visualizing aberration characteristics of the Embodiment 11 of the present invention.
Figure 44:
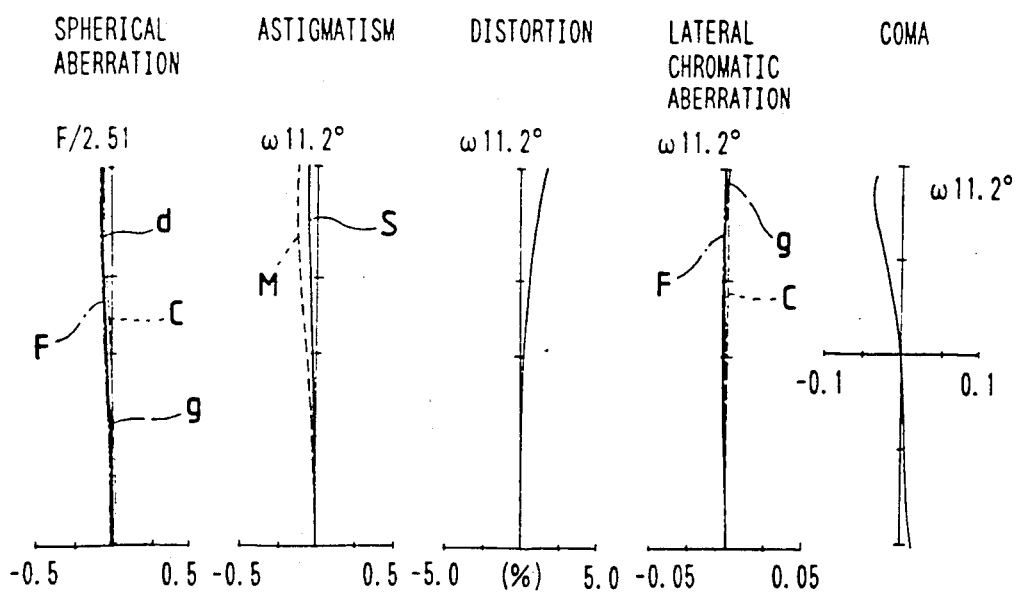
Figure 45:
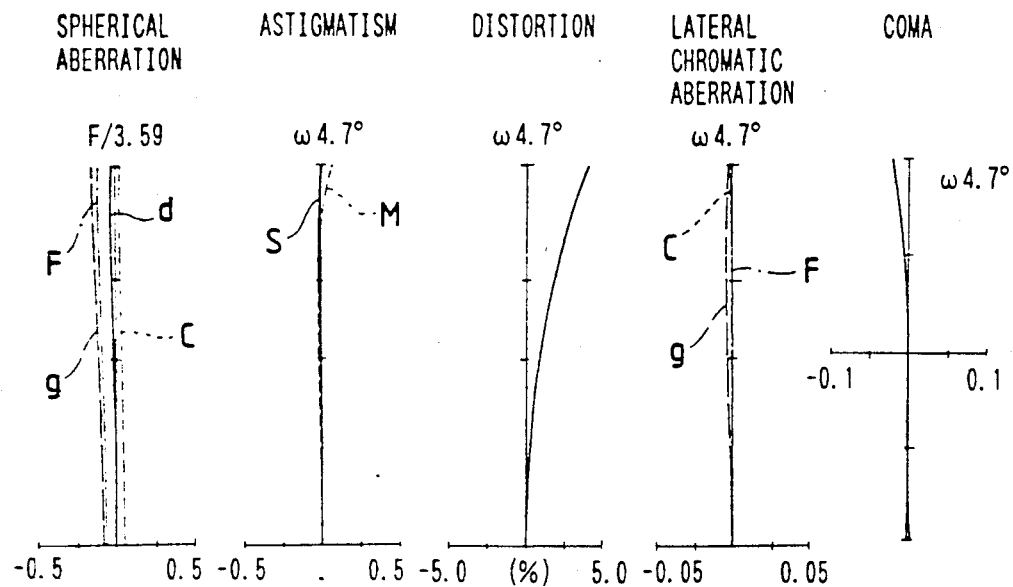

Aberration characteristics at the wide position, intermediate focal length and tele position of the Embodiment 11 are illustrated in FIG. 43, FIG. 44 and FIG. 45 respectively.

Figure 12:
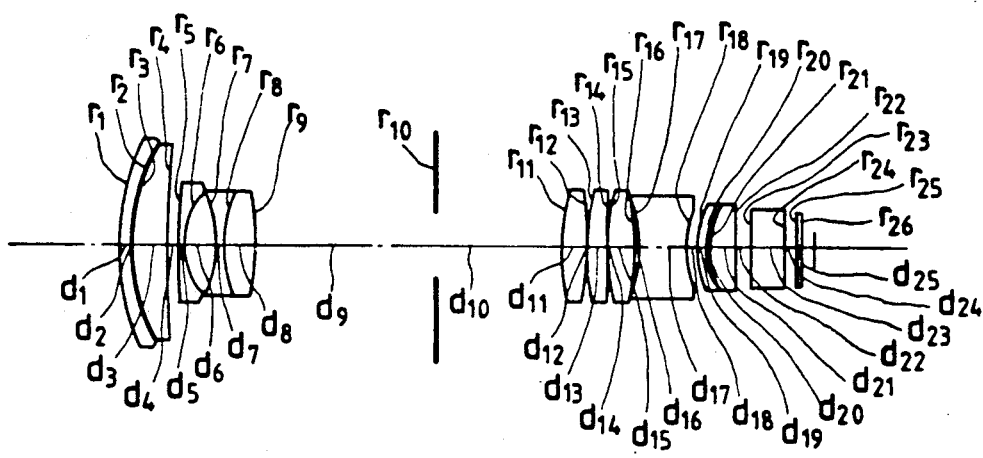

The Embodiment 12 has the composition shown in FIG. 12, wherein the first lens unit consists of a negative lens element and a positive lens element, the second lens unit consists of a negative lens element, a negative lens element and a positive lens element, and the third lens unit consists of a positive lens element, a positive lens element, a positive lens element and a negative lens element.

Figure 46:
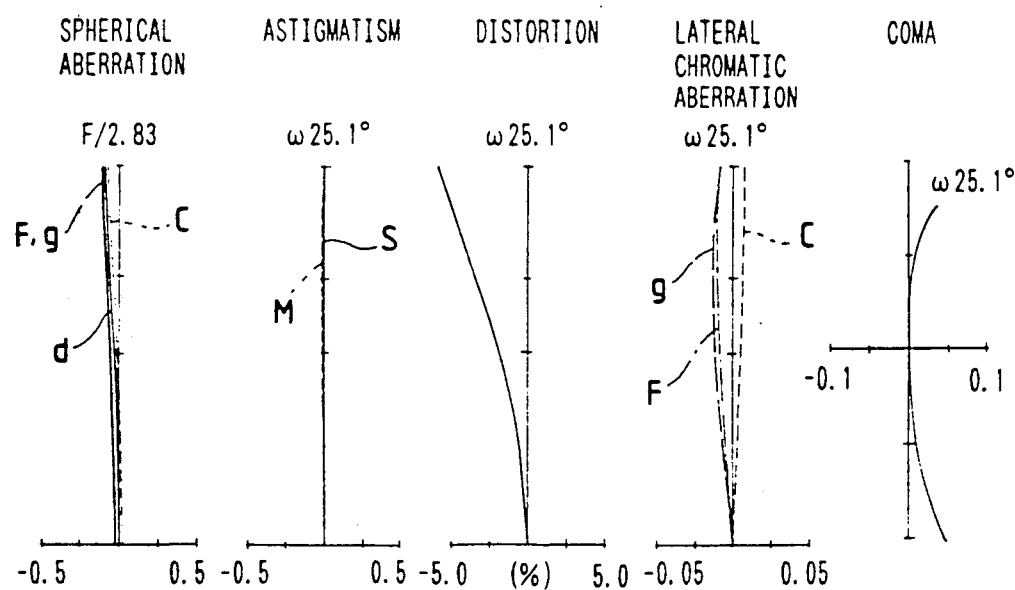
FIG. 46 through FIG. 48 show curves visualizing aberration characteristics of the Embodiment 12 of the present invention.
Figure 47:
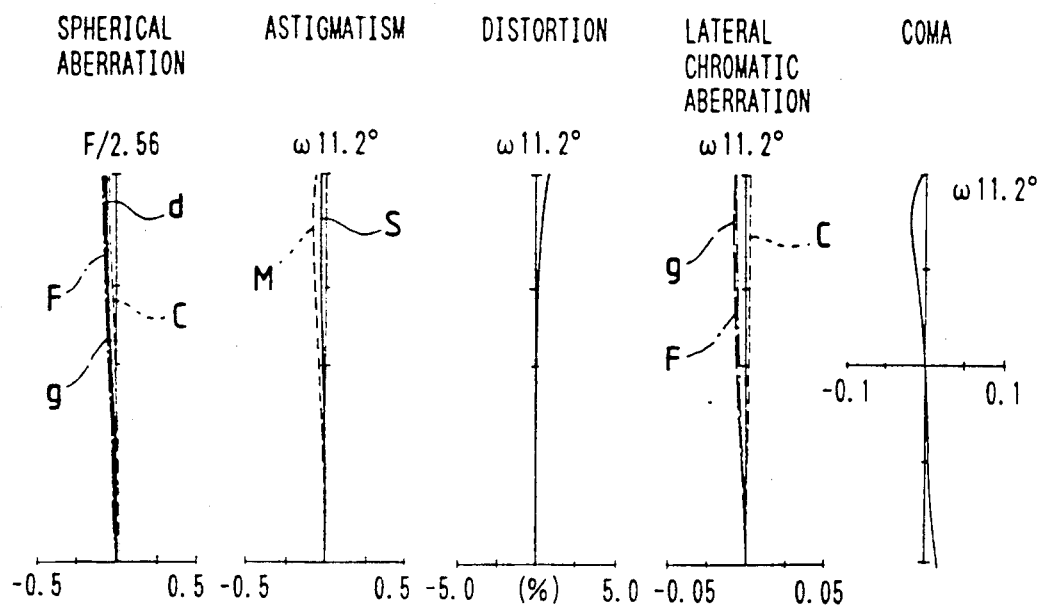
Figure 48:
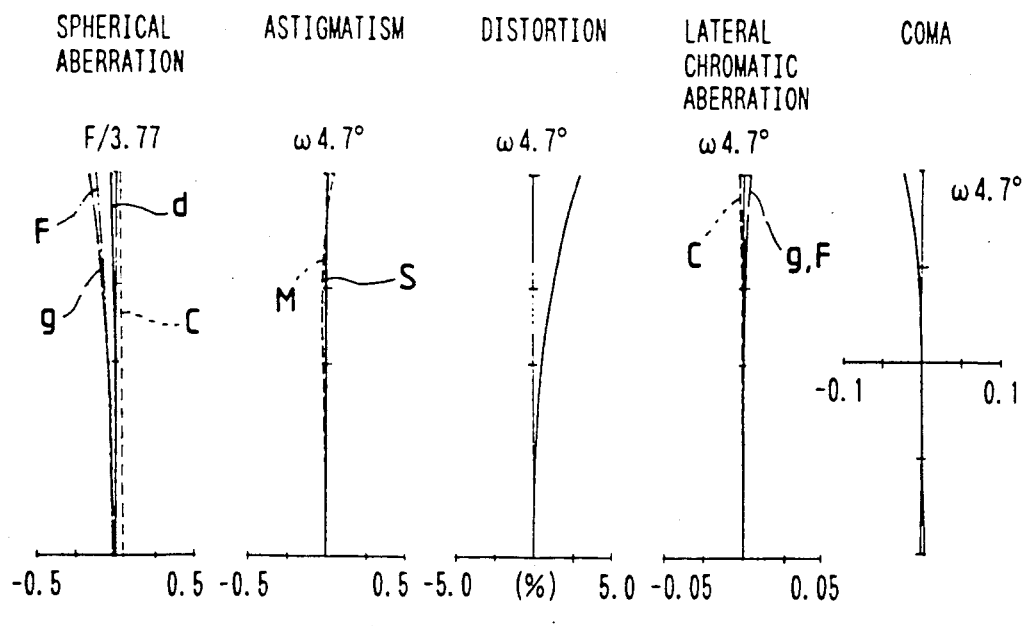

Aberration characteristics at the wide position, intermediate focal length and tele position of the Embodiment 12 are illustrated in FIG. 46, FIG. 47 and FIG. 48 respectively.

In the Embodiment 1 described above, aspherical surfaces are used as the twelfth surface and the fifteenth surface. When the direction of the optical axis is taken as the x axis and the direction perpendicular to the optical axis is taken as the y axis, shapes of these aspherical surfaces are expressed by the following formula:

$$x = \frac{y^2/r}{1 + \sqrt{1-(y/r)^2}} + \sum_{i=2}^{n} A_{2i} y^{2i}$$

wherein the reference symbol r represents the radius of curvature on the vertex of the aspherical surface of interest and the reference symbol $A_{2i}$ designates the aspherical surface coefficient.

As is understood from the foregoing description, the zoom lens system according to the present invention is designed so as to have a short total length and favorable optical performance by reducing, without degrading the imaging function thereof, the diameter and thickness of the first lens unit which is apt to be the heaviest and the largest.

I claim:

1. A zoom lens system comprising, in the order from the object side, a first lens unit having a positive refractive power, a second lens unit having a negative refractive power, an aperture stop, a third lens unit having a positive refractive power and a fourth lens unit having a weak refractive power, and adapted so as to perform variation of focal length thereof by displacing the second lens unit and the third lens unit in the directions reverse to each other with the first lens unit and the fourth lens unit kept fixed; each of said first lens unit and said fourth lens unit comprising not more than four lens elements, and said zoom lens system being designed so as to satisfy the following conditions (1), (2) and (3):

$$-0.5 \sqrt{f_W \cdot f_T} < HF_{III\,IV} < 2 \sqrt{f_W \cdot f_T} \quad (1)$$

$$0.15 \sqrt{f_W \cdot f_T} < t_{IV} < 0.5 \sqrt{f_W \cdot f_T} \quad (2)$$

$$0.2 \sqrt{f_W \cdot f_T} < t_I < 0.5 \sqrt{f_W \cdot f_T} \quad (3)$$

wherein the reference symbol $HF_{III\,IV}$ represents the distance as measured from the object side surface of said third lens unit to the front principal point of the composite system consisting of said third lens unit and said fourth lens unit, the reference symbol $t_{IV}$ designates the thickness of said fourth lens unit, the reference symbol $t_I$ denotes the thickness of said first lens unit, and the reference symbols $f_W$ and $f_T$ represent the focal lengths of said zoom lens system as a whole at the wide position and tele position thereof respectively.

2. A zoom lens system according to claim 1 wherein said first lens unit comprises a negative lens element and a positive lens element, and is designed so as to satisfy the following conditions (4) and (5):

$$\nu_{1p} - \nu_{1n} > 18 \quad (4)$$

$$0.1 < |\phi_{1n}| \sqrt{f_W \cdot f_T} < 0.5 \quad (5)$$

wherein the reference symbols $\nu_{1p}$ and $\nu_{1n}$ represent the average of the Abbe's number of the positive lens element and the negative lens element respectively arranged in said first lens unit, and the reference symbol $\Phi_{1n}$ designates the total refractive power of the negative lens element arranged in said first lens unit.

3. A zoom lens system according to claim 2 wherein said first lens unit comprises, in the order from the object side, a negative lens element, a positive lens element and a positive lens element, and is designed so as to satisfy the following condition (6):

$$0.3 < \Phi_{1p}/\Phi_{2p} < 1.0 \quad (6)$$

wherein the reference symbols $\Phi_{1p}$ and $\Phi_{2p}$ represent the refractive power of the positive lens element arranged on the object side and that of the positive lens element arranged on the image side respectively.

4. A zoom lens system according to claim 1 wherein the lens element arranged on the most object side in said fourth lens unit is designed as a negative meniscus lens element having a convex surface on the object side.

5. A zoom lens system according to claim 1 wherein the lens element arranged on the most image side in said fourth lens unit is designed as a negative meniscus lens element having a convex surface on the image side.

6. A zoom lens system according to claim 1, 2, or 3 wherein said fourth lens unit comprises, in the order from the object side, a negative meniscus lens element having a convex surface on the object side and a positive lens element, and is designed so as to satisfy the following condition (7):

$$-25 < \nu_{4p} - \nu_{4n} < 25 \quad (7)$$

wherein the reference symbols $\nu_{4p}$ and $\nu_{4n}$ represent the Abbe's number of said positive lens element and that of said negative meniscus lens element respectively.

7. A zoom lens system according to claim 1 wherein said second lens unit comprises, in the order from the object side, a negative lens element, a negative lens element and a positive lens element, and is designed so as to satisfy the following conditions (8), (9) and (10):

$$-R_{26} < \sqrt{f_W \cdot f_T} \tag{8}$$

$$2\sqrt{f_W \cdot f_T} < R_{25}/(n_p - n_n) < 5.6\sqrt{f_W \cdot f_T} \tag{9}$$

$$5 < \nu_{2n} - \nu_{2p} < 25 \tag{10}$$

wherein the reference symbols $R_{25}$ and $R_{26}$ represent the radii of curvature on the object side surface and the image side surface respectively of said positive lens element, the reference symbols $n_p$ and $\nu_{2p}$ designate the refractive index and the Abbe's number of said positive lens element, the reference symbol $n_n$ denotes the refractive index of the negative lens element arranged on the image side in said second lens unit, and the reference symbol $\nu_{2n}$ represents the average of the Abbe's numbers of said two negative lens elements.

8. A zoom lens system according to claim 1 wherein said third lens unit comprises, in the order from the object side, a positive lens element, a positive lens element, a negative lens element and a positive lens element, and is designed so as to satisfy the following conditions (11), (12) and (13):

$$-1.0 < R_{35}/R_{34} < 0.8 \tag{11}$$

$$0.05\sqrt{f_W \cdot f_T} < D_{35} < 0.5\sqrt{f_W \cdot f_T} \tag{12}$$

$$15 < \nu_{3p} - \nu_{3n} < 35 \tag{13}$$

wherein the reference symbol $R_{34}$ represents the radius of curvature on the image side surface of the second positive lens element out of said positive lens elements, the reference symbol $R_{35}$ designates the radius of curvature on the object side surface of said negative lens element, the reference symbol $D_{35}$ denotes the thickness of said negative lens element, the reference symbol $\nu_{3p}$ represents the average of the Abbe's numbers of said three positive lens elements and the reference symbol $\nu_{3n}$ designates the Abbe's number of said negative lens element.

9. A zoom lens system according to claim 1 wherein said third lens unit comprises, in the order from the object side, two positive lens elements and a negative lens element, and is designed so as to satisfy the following conditions (12), (13) and (14):

$$0.05\sqrt{f_W \cdot f_T} < D_{35} < 0.5\sqrt{f_W \cdot f_T} \tag{12}$$

$$15 < \nu_{3p} - \nu_{3n} < 35 \tag{13}$$

$$-1 < (R_{31} + R_{32})/(R_{31} - R_{32}) < 0 \tag{14}$$

wherein the reference symbol $D_{35}$ represents the thickness of said negative lens element, the reference symbol $\nu_{3p}$ designates the average of the Abbe's numbers of said two positive lens elements, the reference symbol $\nu_{3n}$ denotes the Abbe's number of said negative lens element, and the reference symbols $R_{31}$ and $R_{32}$ represent the radii of curvature on the object side surface and the image side surface respectively of the positive lens element arranged on the object side out of said two positive lens elements.

10. A zoom lens system according to claim 1 wherein said third lens unit comprises, in the order from the object side, a three positive lens elements and a negative lens element, and is designed so as to satisfy the following conditions (12), (13) and (14):

$$0.05\sqrt{f_W \cdot f_T} < D_{35} < 0.5\sqrt{f_W \cdot f_T} \tag{12}$$

$$15 < \nu_{3p} - \nu_{3n} < 35 \tag{13}$$

$$-1 < (R_{31} + R_{32})/(R_{31} - R_{32}) < 0 \tag{14}$$

wherein the reference symbol $D_{35}$ represent the thickness of said negative lens element, the reference symbol $\nu_{3p}$ designates the average of the Abbe's numbers of said three positive lens elements, the reference symbol $\nu_{3n}$ denotes the Abbe's number of said negative lens element, and the reference symbols $R_{31}$ and $R_{32}$ represent the radii of curvature on the object side surface and the image side surface of the first lens element out of said three positive lens elements.

11. A zoom lens system according to claim 1 wherein said fourth lens unit comprises, in the order from the object side, a positive lens element and a negative meniscus lens element having a convex surface on the image side, and is designed so as to satisfy the following condition (7):

$$-25 < \nu_{4p} - \nu_{4n} < 25 \tag{7}$$

wherein the reference symbol $\nu_{4n}$ represents the Abbe's number of the medium of said negative meniscus lens element and the reference symbol $\nu_{4p}$ designates the Abbe's number of the lens element arranged adjacent to said negative meniscus lens element.

12. A zoom lens system comprising, in the order from the object side, first lens unit having a positive refractive power, a second lens unit having a negative refractive power and a third lens unit having a positive refractive power, adapted so as to perform variation of focal length by displacing the second lens unit and the third lens unit in the directions reverse to each other along the optical axis with the first lens unit kept fixed, and designed so as to satisfy the following conditions (15), (16) and (17):

$$-0.5\sqrt{f_W \cdot f_T} < HF_{III} < 2\sqrt{f_W \cdot f_T} \tag{15}$$

$$0.2\sqrt{f_W \cdot f_T} < t_I < 0.45\sqrt{f_W \cdot f_T} \tag{16}$$

$$0.5\gamma < \beta_{III\ T}/\beta_{III\ W} < 0.7\gamma \tag{17}$$

wherein the reference symbol $HF_{III}$ represents the distance as measured from the object side surface of said third lens unit to the principal point thereof at the tele position, the reference symbol $t_I$ designates the thickness of said first lens unit, the reference symbols $\beta_{III\ W}$ and $\beta_{III\ T}$ denote the magnifications of said third lens unit at the wide position and the tele position respectively, the reference symbols $f_W$ and $f_T$ represent the focal lengths of said zoom lens system as a whole at the wide position and the tele position respectively, and the reference symbol $\gamma$ denotes the zooming ratio of said zoom lens system.

13. A zoom lens system according to claim 12 wherein said third lens unit comprises, in the order from the object side, a positive lens element, a negative lens element, a positive lens element and a positive lens element.

14. A zoom lens system according to claim 12 wherein said third lens unit comprises, in the order from the object side, a positive lens element, a positive lens element, a negative lens element and a positive lens element.

* * * * *